United States Patent
Shimada et al.

(10) Patent No.: US 8,608,255 B2
(45) Date of Patent: Dec. 17, 2013

(54) VEHICLE AND CONTROL METHOD OF VEHICLE

(75) Inventors: Michihito Shimada, Mishima (JP); Kazuya Maki, Nagoya (JP)

(73) Assignees: Toyota Jidosha Kabushiki Kaisha, Toyota-Shi (JP); Advics Co., Ltd., Kariya-Shi (JP)

( * ) Notice: Subject to any disclaimer, the term of this patent is extended or adjusted under 35 U.S.C. 154(b) by 1282 days.

(21) Appl. No.: 11/727,280

(22) Filed: Mar. 26, 2007

(65) Prior Publication Data

US 2007/0241611 A1 Oct. 18, 2007

(30) Foreign Application Priority Data

Apr. 14, 2006 (JP) .................................. 2006-112630
Apr. 14, 2006 (JP) .................................. 2006-112631

(51) Int. Cl.
*B60T 8/64* (2006.01)
*B60T 8/32* (2006.01)

(52) U.S. Cl.
USPC .................... 303/152; 303/3; 303/10; 303/15

(58) Field of Classification Search
USPC .............. 188/156, 159, 182; 180/65.1, 65.21; 701/70, 78; 303/3, 9.61, 9.62, 15, 20, 303/157, 158, 191, DIG. 9
See application file for complete search history.

(56) References Cited

U.S. PATENT DOCUMENTS

| | | | |
|---|---|---|---|
| 4,270,806 A * | 6/1981 | Venkataperumal et al. ...... | 303/3 |
| 5,895,100 A | 4/1999 | Ito et al. | |
| 6,086,166 A * | 7/2000 | Fukasawa ..................... | 303/152 |
| 6,213,571 B1 * | 4/2001 | Yamada et al. ............... | 303/152 |
| 6,244,674 B1 * | 6/2001 | Kuno et al. ................... | 303/152 |
| 6,325,470 B1 * | 12/2001 | Schneider ..................... | 303/152 |
| 6,402,260 B1 * | 6/2002 | Kobayashi et al. ............. | 303/20 |
| 6,813,553 B2 * | 11/2004 | Nakamura et al. ............. | 701/70 |
| 2004/0054450 A1 * | 3/2004 | Nakamura et al. ............. | 701/22 |
| 2004/0122579 A1 * | 6/2004 | Ashizawa et al. .............. | 701/70 |

FOREIGN PATENT DOCUMENTS

| | | |
|---|---|---|
| DE | 197 03 061 A1 | 7/1997 |
| DE | 19842450 A1 | 3/1999 |
| JP | 06-55941 | 3/1994 |
| JP | 06-284510 | 10/1994 |
| JP | 08-098315 | 4/1996 |
| JP | 2001-292503 A | 10/2001 |
| JP | 2002-095104 | 3/2002 |
| JP | 2002-095106 | 3/2002 |
| JP | 2004-196064 A | 7/2004 |
| JP | 2005-145147 | 6/2005 |
| JP | 2006-034034 A | 2/2006 |

* cited by examiner

*Primary Examiner* — Melody Burch
(74) *Attorney, Agent, or Firm* — Kenyon & Kenyon LLP

(57) ABSTRACT

When vehicle speed V decreases to or below a preset reference vehicle speed Vref during output of regenerative braking force from a motor in response to the driver's depression of a brake pedal, the vehicle of the invention performs a replacement pre-operation (steps S190 to S220 and S160) and a replacement operation (steps S240 to S280 and S160) and controls the motor and an electronically controlled hydraulic braking system to satisfy a braking force demand BF*. The replacement pre-operation actuates and controls pumps included in a brake actuator of the electronically controlled hydraulic braking system to exert their proper pressurization performance. The replacement operation decreases the regenerative braking force output from the motor and enhances a pressure increase by the pumps to replace the regenerative braking force with a pressure increase-based braking force BFpp.

22 Claims, 7 Drawing Sheets

VEHICLE AND CONTROL METHOD OF VEHICLE

BACKGROUND OF THE INVENTION

1. Field of the Invention

The present invention relates to a vehicle and a control method of the vehicle. More specifically the invention pertains to a vehicle equipped with a motor that is capable of outputting regenerative braking force, as well as to a corresponding control method of such a vehicle.

2. Description of the Related Art

In one proposed structure of an electric vehicle, an electric motor in an electric driving system is used to rotate drive wheels both in a normal direction and in a reverse direction. When the vehicle speed exceeds a preset reference vehicle speed at the timing of the driver's depression of a brake pedal, the electric vehicle of this structure performs regenerative braking control (see, for example, Japanese Patent Laid-Open Gazette No. H06-284510). There is a vehicle equipped with an engine and a motor generator for regenerative braking. The vehicle stops the regenerative braking by the motor when the vehicle speed decreases to or below a preset threshold value. The vehicle changes the threshold value for stopping the regenerative braking according to the engine drive mode (see, for example, Japanese Patent Laid-Open Gazette No. 2002-95106).

One proposed braking system for an electric vehicle equipped with a motor controls the motor to give a regenerative braking force, which is equal to a difference between an operational braking force computed from the driver's depression amount of a brake pedal and a mechanical braking force computed from a wheel cylinder pressure (see, for example, Japanese Patent Laid-Open Gazette No. H08-98315). One proposed structure of a vehicle includes both an engine and a motor generator for regenerative braking. This vehicle stops the regenerative braking at a vehicle speed decreasing to or below a preset reference vehicle speed and changes a threshold value for stopping the regenerative braking according to the drive mode of the engine (see, for example, Japanese Patent Laid-Open Gazette No. 2002-095106). Another proposed structure of a vehicle has a drive motor to output a regenerative torque to drive wheels, and a hydraulic braking system to give a braking force to front and rear wheels corresponding to the hydraulic pressure generated by the driver's pressing force of a brake pedal. Upon satisfaction of a predetermined condition, this vehicle reduces the hydraulic pressure applied to the drive wheels by the hydraulic braking system and increases the regenerative torque produced by the drive motor corresponding to the decreased hydraulic pressure (see, for example, Japanese Patent Laid-Open Gazette No. 2005-145147).

SUMMARY OF THE INVENTION

The regenerative braking force of the motor generally decreases with a decrease in vehicle speed. By taking into account this decreasing tendency of the regenerative braking force and the operation efficiency of the motor, it is desirable to stop the regenerative control of the motor in response to a decrease of the vehicle speed to or below a preset level during braking of the vehicle with the regenerative braking force and to replace the regenerative braking force with the braking force of, for example, a hydraulic braking system. The hydraulic braking system equipped with a brake actuator of relatively simple structure that does not have an accumulator or pressure reservoir generally has a response delay and requires some time to obtain a desired response after the start of actuation. Failed replacement of the regenerative braking force with the braking force of the hydraulic braking system may cause failed output of a braking force satisfying the driver's demand and make the driver feel uneasy and uncomfortable.

In response to the driver's gearshift operation or according to the state of charge of an accumulator unit for accumulating the regenerative electric power produced by the motor, there may be a need for stopping the regenerative control of the motor during braking of the vehicle taking advance of the regenerative braking force and for replacing the regenerative braking force with the braking force produced by, for example, a hydraulic braking system. The hydraulic braking system equipped with a brake actuator of relatively simple structure that does not have an accumulator or pressure reservoir generally has a response delay and requires some time to obtain a desired response after the start of actuation. Failed replacement of the regenerative braking force with the braking force of the hydraulic braking system in response to a regeneration stop command may cause failed output of a braking force satisfying the driver's demand and make the driver feel uneasy and uncomfortable.

The vehicle of the invention and the corresponding control method of the vehicle thus aim to enable smooth replacement of regenerative braking force output from a motor with braking force output from a fluid pressure braking structure. The vehicle of the invention and the corresponding control method of the vehicle also aim to prevent the driver from feeling uneasy and uncomfortable against the driver's braking operation.

In order to attain at least part of the above and the other related objects, the vehicle of the invention and the corresponding control method of the vehicle have the configurations discussed below.

The present invention is directed to a vehicle. The vehicle includes: a motor outputting at least a regenerative braking force to an axle; an accumulator unit inputting and outputting electric power from and to the motor; a fluid pressure braking unit including a pressurization device for pressurization of an operation fluid and generating and outputting a braking force based on an operational pressure of the operation fluid produced by a driver's braking operation and a pressure increase of the operation fluid induced by pressurization of the operation fluid by the pressurization device; a braking force demand setting module setting a braking force demand required by the driver, in response to the driver's braking operation; and a braking control module controlling the motor and the fluid pressure braking unit to ensure output of the set braking force demand while performing a replacement pre-operation and a replacement operation upon satisfaction of a predetermined replacement condition during output of the regenerative braking force from the motor in response to the driver's braking operation, the replacement pre-operation being an operation that actuates and controls the pressurization device to exert its proper pressurization performance, the replacement operation being an operation that decreases the regenerative braking force output from the motor and enhances the pressure increase by the pressurization device to replace the regenerative braking force with a pressure increase-based braking force.

Upon satisfaction of the predetermined replacement condition during output of the regenerative braking force from the motor in response to the driver's braking operation, the vehicle of the invention controls the motor and the fluid pressure braking structure to perform the replacement pre-operation and the replacement operation and ensure output of a braking force demand required by the driver. The replacement pre-operation actuates and controls the pressurization unit of the fluid pressure braking structure to exert its proper pressurization performance. The replacement operation decreases the regenerative braking force output from the motor and enhances the pressure increase by the pressurization unit to replace the regenerative braking force with the pressure increase-based braking force. In the vehicle of the invention, after the preliminary operation control of the pressurization unit to exert its proper pressurization performance, the substantial replacement operation is performed to replace the regenerative braking force output from the motor with the pressure increase-based braking force based on the pressure increase by the pressurization unit. This enables smooth replacement of the regenerative braking force of the motor with the braking force of the fluid pressure braking structure and ensures output of the braking force demand required by the driver. Such braking control effectively prevents the driver from feeling uneasy and uncomfortable against the driver's braking operation.

In one preferable embodiment of the vehicle of the invention, the replacement pre-operation may cause a smaller decrease of the regenerative braking force than the decrease of the regenerative braking force in the replacement operation. The replacement pre-operation is a preliminary process before exertion of the proper pressurization performance of the pressurization unit. During the replacement pre-operation, it is desirable to have a small decrease of the regenerative braking force to use the regenerative braking force for satisfaction of the braking force demand. The decrease of the regenerative braking force may be equal to or approximate to 0 during the replacement pre-operation.

In another preferable embodiment of the vehicle of the invention, the replacement pre-operation may actuate and control the pressurization device in a specific mode for only a time period elapsed before cancellation of an initial response delay of the pressurization performance of the pressurization device since a start of actuation of the pressurization device and causes the regenerative braking force output from the motor to compensate for an insufficiency of the pressure increase-based braking force due to the initial response delay. The replacement pre-operation enables cancellation of the initial response delay of the pressurization performance of the pressurization unit, while ensuring satisfaction of the braking force demand. On completion of the replacement pre-operation, the pressurization unit can exert its proper pressurization performance. The braking control of this aspect enables smooth replacement of the regenerative braking force of the motor with the pressure increase-based braking force, which is based on the pressure increase by the pressurization unit.

In still another preferable embodiment of the vehicle of the invention, the replacement operation may control the motor and the pressurization device of the fluid pressure braking unit to make a decrease of the regenerative braking force per unit time substantially equal to an enhancement of the pressure increase-based braking force per unit time.

In further still another preferable embodiment of the vehicle of the invention, the predetermined replacement condition may be satisfied according to a driving state of the vehicle. Moreover, the vehicle of the present invention may further include a vehicle speed measurement unit measuring vehicle speed, and the predetermined replacement condition may be satisfied when the measured vehicle speed decreases to or below a preset reference vehicle speed. Further, the preset reference vehicle speed may be higher than a regeneration stop vehicle speed, the regeneration stop vehicle speed being specified as a threshold value for prohibiting regeneration by the motor based on a variation in regenerative braking force of the motor against vehicle speed. The replacement pre-operation is performed at the vehicle speed of a still relatively high level. Such braking control ensures execution of the replacement operation at the timing requiring prohibition of regeneration by the motor according to the variation in regenerative braking force against the vehicle speed. The regenerative braking force of the motor is thus smoothly replaceable with the pressure increase-based braking force, which is based on the pressure increase by the pressurization unit.

In further still another preferable embodiment of the vehicle of the invention, the predetermined replacement condition may be satisfied when a command for stopping regeneration by the motor is given. In the vehicle of the invention, after the preliminary operation control of the pressurization unit to exert its proper pressurization performance, the substantial replacement operation is performed in response to the command for stopping regeneration by the motor. The substantial replacement operation replaces the regenerative braking force output from the motor with the pressure increase-based braking force based on the pressure increase by the pressurization unit. This enables smooth replacement of the regenerative braking force of the motor with the braking force of the fluid pressure braking structure and ensures output of the braking force demand required by the driver. Such braking control effectively prevents the driver from feeling uneasy and uncomfortable against the driver's braking operation.

In further still another preferable embodiment of the vehicle of the invention, the vehicle of the invention may further include: a driving power output source outputting a driving power either to the one axle or to the other axle different from the one axle; a coupling-decoupling unit coupling and decoupling the driving power output source with and from either the one axle or the other axle; and a gearshift position setting unit allowing the driver's setting of a neutral position to decouple the driving power output source from either the one axle or the other axle and to give an operation stop command for stopping operation of the motor. And the command for stopping regeneration by the motor may be given in response to the driver's setting of the neutral position. When the command for stopping regeneration by the motor is given in response to the driver's setting of the gearshift position to the neutral position during braking of the vehicle taking advantage of the regenerative braking force, the replacement pre-operation and the replacement operation are sequentially performed to replace the regenerative braking force with the pressure increase-based braking force. This arrangement stops regeneration by the motor, while effectively ensuring output of the braking force demand required by the driver and preventing the driver from feeling uneasy and uncomfortable.

In further still another preferable embodiment of the vehicle of the invention, the command for stopping regeneration by the motor may be given when a current state of charge of the accumulator unit reaches or exceeds a preset charge level. When the command for stopping regeneration by the motor is given according to the current state of charge of the accumulator unit during braking of the vehicle taking advantage of the regenerative braking force, the replacement pre-operation and the replacement operation are sequentially performed to replace the regenerative braking force with the pressure increase-based braking force. This arrangement stops regeneration by the motor, while effectively ensuring output of the braking force demand required by the driver and preventing the driver from feeling uneasy and uncomfortable.

The present invention is also directed to a control method of a vehicle. The vehicle includes: a motor outputting at least a regenerative braking force to an axle; an accumulator unit inputting and outputting electric power from and to the motor; and a fluid pressure braking unit including a pressurization device for pressurization of an operation fluid and generates and outputs a braking force based on an operational pressure of the operation fluid produced by a driver's braking operation and a pressure increase of the operation fluid induced by pressurization of the operation fluid by the pressurization device. The method includes the steps of: controlling the motor and the fluid pressure braking unit to ensure output of a braking force demand required by the driver while performing a replacement pre-operation and a replacement operation upon satisfaction of a predetermined replacement condition during output of the regenerative braking force from the motor in response to the driver's braking operation, the replacement pre-operation being an operation that actuates and controls the pressurization device to exert its proper pressurization performance, the replacement operation being an operation that decreases the regenerative braking force output from the motor and enhances the pressure increase by the pressurization device to replace the regenerative braking force with a pressure increase-based braking force.

In the control method of the vehicle of the invention, after the preliminary operation control of the pressurization unit to exert its proper pressurization performance, the substantial replacement operation is performed to replace the regenerative braking force output from the motor with the pressure increase-based braking force based on the pressure increase by the pressurization unit. This enables smooth replacement of the regenerative braking force of the motor with the braking force of the fluid pressure braking structure and ensures output of the braking force demand required by the driver. Such braking control effectively prevents the driver from feeling uneasy and uncomfortable against the driver's braking operation.

In one preferable embodiment of the control method of the vehicle of the invention, the replacement pre-operation may cause a smaller decrease of the regenerative braking force than the decrease of the regenerative braking force in the replacement operation.

In another preferable embodiment of the control method of the vehicle of the invention, the replacement pre-operation may actuate and control the pressurization device in a specific mode for only a time period elapsed before cancellation of an initial response delay of the pressurization performance of the pressurization device since a start of actuation of the pressurization device and cause the regenerative braking force output from the motor to compensate for an insufficiency of the pressure increase-based braking force due to the initial response delay.

In still another preferable embodiment of the control method of the vehicle of the invention, the replacement operation may control the motor and the pressurization device of the fluid pressure braking unit to make a decrease of the regenerative braking force per unit time substantially equal to an enhancement of the pressure increase-based braking force per unit time.

In further still another preferable embodiment of the control method of the vehicle of the invention, the predetermined replacement condition may be satisfied according to a driving state of the vehicle. Moreover, the predetermined replacement condition may be satisfied when vehicle speed of the vehicle decreases to or below a preset reference vehicle speed. Further, the preset reference vehicle speed may be higher than a regeneration stop vehicle speed, the regeneration stop vehicle speed being specified as a threshold value for prohibiting regeneration by the motor based on a variation in regenerative braking force of the motor against vehicle speed.

In further still another preferable embodiment of the control method of the vehicle of the invention, the predetermined replacement condition may be satisfied when a command for stopping regeneration by the motor is given.

In further still another preferable embodiment of the control method of the vehicle of the invention, the vehicle may further include: a driving power output source outputting a driving power either to the one axle or to the other axle different from the one axle; a coupling-decoupling unit coupling and decoupling the driving power output source with and from either the one axle or the other axle; and a gearshift position setting unit allowing the driver's setting of a neutral position to decouple the driving power output source from either the one axle or the other axle and to give an operation stop command for stopping operation of the motor. And the command for stopping regeneration by the motor may be given in response to the driver's setting of the neutral position.

In further still another preferable embodiment of the control method of the vehicle of the invention, the command for stopping regeneration by the motor may be given when a current state of charge of the accumulator unit reaches or exceeds a preset charge level.

DESCRIPTION OF THE PREFERRED EMBODIMENTS

Some modes of carrying out the invention are described below as preferred embodiments.

A. First Embodiment

Figure 1:
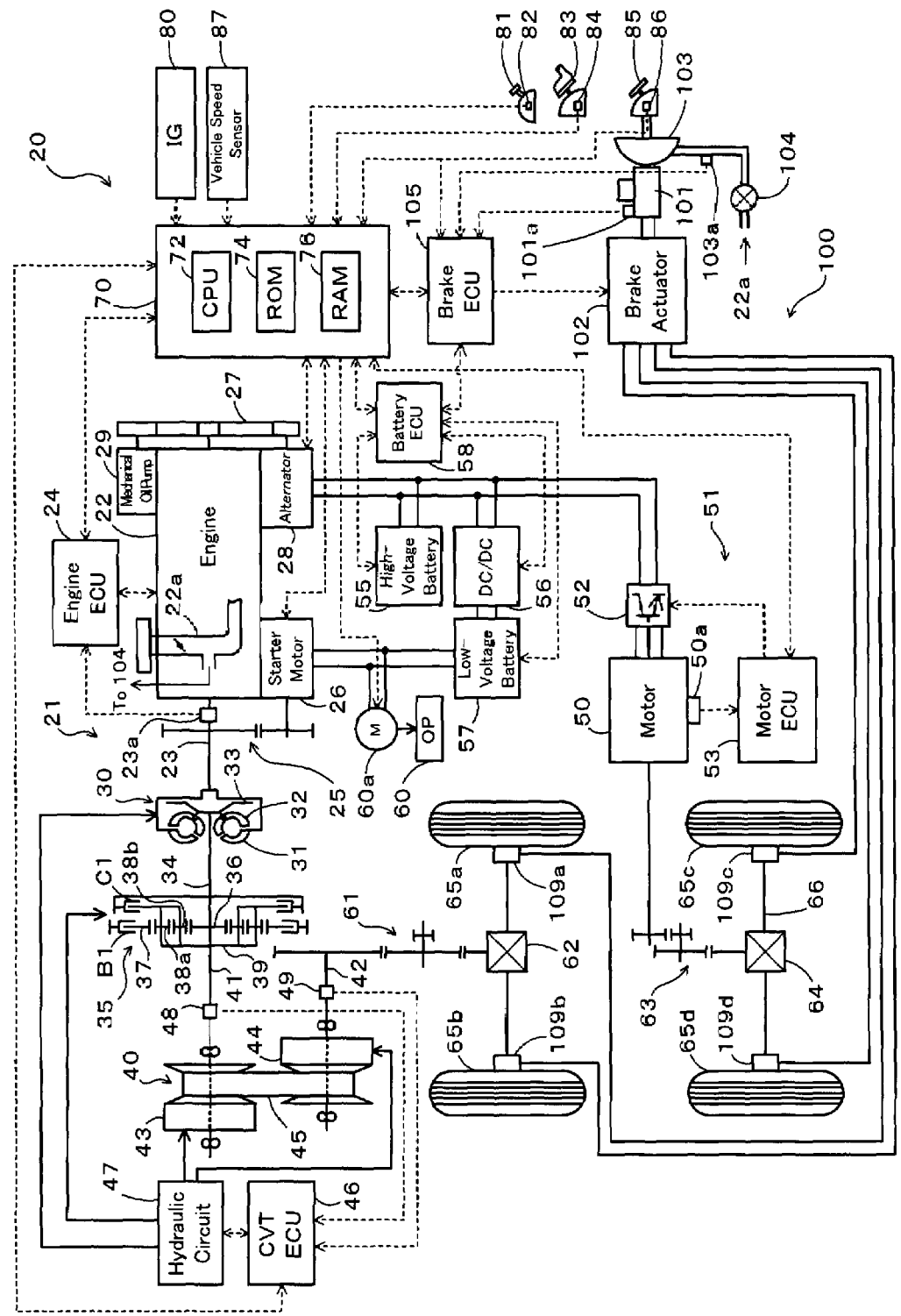
FIG. 1 schematically illustrates the configuration of a hybrid vehicle in a first embodiment of the invention.

FIG. 1 schematically illustrates the configuration of a hybrid vehicle 20 in a first embodiment of the invention. The hybrid vehicle 20 of the embodiment has a front wheel driving system 21 for transmission of output power of an engine 22 to front wheels 65a and 65b via a torque converter 30, a forward-backward drive switchover mechanism 35, a belt-driven continuously variable transmission (hereafter referred to as 'CVT') 40, a gear mechanism 61, and a differential gear 62, a rear wheel driving system 51 for transmission of output power of a motor 50 to rear wheels 65c and 65d via a gear mechanism 63, a differential gear 64, and a rear axle 66, an electronically controlled hydraulic braking system (hereafter referred to as 'HBS') 100 for application of braking force to the front wheels 65a and 65b and to the rear wheels 65c and 65d, and a hybrid electronic control unit (hereafter referred to as 'hybrid ECU') 70 for controlling the operations of the whole hybrid vehicle 20.

The engine 22 is an internal combustion engine that consumes a hydrocarbon fuel, such as gasoline or light oil, to output the power. A crankshaft 23 as an output shaft of the engine 22 is linked to the torque converter 30. The crankshaft 23 is also connected with a starter motor 26 via a gear train 25 and with an alternator 28 and a mechanical oil pump 29 via a belt 27. The engine 22 is driven and operated under control of an engine electronic control unit (hereafter referred to as 'engine ECU') 24. The engine ECU 24 receives input signals from various sensors measuring and detecting the operation conditions of the engine 22, for example, a crank position signal from a crank position sensor 23a attached to the crankshaft 23. The engine ECU 24 regulates the amount of fuel injection and the amount of intake air and adjusts the ignition timing, in response to these input signals. The engine ECU 24 makes communication with the hybrid ECU 70 to control the operation of the engine 22 in response to control signals from the hybrid ECU 70 and to output data regarding the operating conditions of the engine 22 to the hybrid ECU 70 according to the requirements.

The torque converter 30 of this embodiment is a fluid-type torque converter with a lockup clutch. The torque converter 30 includes a turbine runner 31 connected to the crankshaft 23 of the engine 22, a pump impeller 32 connected to an input shaft 41 of the CVT 40 via the forward-backward drive switchover mechanism 35, and a lockup clutch 33. The lockup clutch 33 is actuated by means of hydraulic pressure applied by a hydraulic circuit 47, which is driven and operated under control of a CVT electronic control unit (hereafter referred to as 'CVTECU') 46. The lockup clutch 33 locks up the turbine runner 31 and the pump impeller 32 of the torque converter 30 when required.

The forward-backward drive switchover mechanism 35 includes a double-pinion planetary gear mechanism, a brake B1, and a clutch C1. The double-pinion planetary gear mechanism includes a sun gear 36 as an external gear, a ring gear 37 as an internal gear arranged concentrically with the sun gear 36, multiple first pinion gears 38a engaging with the sun gear 36, multiple second pinion gears 38b engaging with the respective first pinion gears 38a and with the ring gear 37, and a carrier 39 connecting and holding the multiple first pinion gears 38a and the multiple second pinion gears 38b to allow both their revolutions and their rotations on their axes. The sun gear 36 and the carrier 39 are respectively linked to an output shaft 34 of the torque converter 30 and to the input shaft 41 of the CVT 40. The ring gear 37 of the planetary gear mechanism is fixed to a casing (not shown) via the brake B1. The on-off setting of the brake B1 freely prohibits and allows rotation of the ring gear 37. The sun gear 36 and the carrier 39 of the planetary gear mechanism are interconnected via the clutch C1. The on-off setting of the clutch C1 couples and decouples the sun gear 36 with and from the carrier 39. In the forward-backward drive switchover mechanism 35 of this structure, in the off position of the brake B1 and the on position of the clutch C1, the rotation of the output shaft 34 of the torque converter 30 is directly transmitted to the input shaft 41 of the CVT 40 to move the hybrid vehicle 20 forward. In the on position of the brake B1 and the off position of the clutch C1, the rotation of the output shaft 34 of the torque converter 30 is inverted to the reverse direction and is transmitted to the input shaft 41 of the CVT 40 to move the hybrid vehicle 20 backward. In the off positions of both the brake B1 and the clutch C1, the output shaft 34 of the torque converter 30 is decoupled from the input shaft 41 of the CVT 40.

The CVT 40 includes a primary pulley 43 of variable groove width linked to the input shaft 41, a secondary pulley 44 of variable groove width linked to an output shaft 42 or a driveshaft, and a belt 45 set in the grooves of the primary pulley 43 and the secondary pulley 44. The groove widths of the primary pulley 43 and the secondary pulley 44 are varied by the hydraulic pressure generated by the hydraulic circuit 47 under operation control of the CVTECU 46. Varying the groove widths enables the input power of the input shaft 41 to go through the continuously variable speed change and to be output to the output shaft 42. The groove widths of the primary pulley 43 and the secondary pulley 44 are varied to regulate the clamping force of the belt 45 for adjustment of the transmission torque capacity of the CVT 40, as well as to vary the change gear ratio. The hydraulic circuit 47 regulates the pressure and the flow rate of brake oil (operational fluid) fed by an electric oil pump 60, which is driven by a motor 60a, and by the mechanical oil pump 29, which is driven by the engine 22, and supplies the brake oil of the regulated pressure and flow rate to the primary pulley 43, the secondary pulley 44, the torque converter 30 (lockup clutch 33), the brake B1, and the clutch C1. The CVTECU 46 inputs a rotation speed Nin of the input shaft 41 from a rotation speed sensor 48 attached to the input shaft 41 and a rotation speed Nout of the output shaft 42 from a rotation speed sensor 49 attached to the output shaft 42. The CVTECU 46 generates and outputs driving signals to the hydraulic circuit 47, in response to these input data. The CVTECU 46 also controls on and off the brake B1 and the clutch C1 of the forward-backward drive switchover mechanism 35 and performs the lockup control of the torque converter 30. The CVTECU 46 makes communication with the hybrid ECU 70 to regulate the change gear ratio of the CVT 40 in response to control signals from the hybrid ECU 70 and to output data regarding the operating conditions of the CVT 40, for example, the rotation speed Nin of the input shaft 41 and the rotation speed Nout of the output shaft 42, to the hybrid ECU 70 according to the requirements.

The motor 50 is constructed as a known synchronous motor generator that may be actuated both as a generator and as a motor. The motor 50 is connected with the alternator 28, which is driven by the engine 22, via an inverter 52 and with a high-voltage battery 55 (for example, a secondary battery having a rated voltage of 42 V) having its output terminal linked to a power line from the alternator 28. The motor 50 is accordingly driven with electric power supplied from the alternator 28 or from the high-voltage battery 55 and generates regenerative electric power during deceleration to charge the high-voltage battery 55. The motor 50 is driven and operated under control of a motor electronic control unit (hereafter referred to as 'motor ECU') 53. The motor ECU 53 receives input signals required for the operation control of the motor 50, for example, signals from a rotational position detection sensor 50a that detects the rotational position of a rotor in the motor 50 and values of phase current for the motor 50 from a current sensor (not shown). The motor ECU 53 generates and outputs switching signals to switching elements included in the inverter 52, in response to these input signals. The motor ECU 53 makes communication with the hybrid ECU 70 to output switching control signals to the inverter 52 for the operation control of the motor 50 in response to control signals from the hybrid ECU 70 and to output data regarding the operating conditions of the motor 50 to the hybrid ECU 70 according to the requirements. The high-voltage battery 55 is connected with a low-voltage battery 57 via a DC-DC converter 56 having the function of voltage conversion. The electric power supplied from the high-voltage battery 55 goes through the voltage conversion by the DC-DC converter 56 and is transmitted to the low-voltage battery 57. The low-voltage battery 57 is used as the power source of various auxiliary machines including the electric oil pump 60. Both the high-voltage battery 55 and the low-voltage battery 57 are under management and control of a battery electronic control unit (hereafter referred to as 'battery ECU') 58. The battery ECU 58 computes remaining charge levels or states of charge (SOC) and input and output limits of the high-voltage battery 55 and the low-voltage battery 57, based on inter-terminal voltages from voltage sensors (not shown) attached to the respective output terminals (not shown) of the high-voltage battery 55 and the low-voltage battery 57, charge-discharge electric currents from current sensors (not shown), and battery temperatures from temperature sensors (not shown). The battery ECU 58 makes communication with the hybrid ECU 70 to output data regarding the conditions of the high-voltage battery 55 and the low-voltage battery 57, for example, their states of charge (SOC), to the hybrid ECU 70 according to the requirements.

The HBS 100 mounted on the hybrid vehicle 20 has a master cylinder 101, a brake actuator 102, and wheel cylinders 109a through 109d respectively provided for the front wheels 65a and 65b and the rear wheels 65c and 65d. The HBS 100 supplies a master cylinder pressure Pmc to the wheel cylinders 109a through 109d for the front wheels 65a and 65b and the rear wheels 65c and 65d via the brake actuator 102, so as to apply master cylinder pressure Pmc-based braking force to the front wheels 65a and 65b and the rear wheels 65c and 65d. The master cylinder pressure Pmc is generated by the master cylinder 101 as an operation pressure in response to the driver's depression of a brake pedal 85. In the HBS 100 of this embodiment, the master cylinder 101 is provided with a brake booster 103 that utilizes a negative pressure Pn produced by the engine 22 to assist the driver's braking operation. As shown in FIG. 1, the brake booster 103 is connected to an intake manifold 22a of the engine 22 via piping and a check valve 104 and works as a vacuum power-boosting device. The brake booster 103 utilizes the force applied to a diaphragm (not shown) due to a differential pressure between the outside air pressure and the negative intake pressure of the engine 22 and amplifies the driver's pressing force of the brake pedal 85. A piston (not shown) in the master cylinder 101 receives the driver's pressing force of the brake pedal 85 and the assist of negative pressure in the brake booster 103 and pressurizes the brake oil. The master cylinder 101 accordingly generates the master cylinder pressure Pmc corresponding to the driver's pressing force of the brake pedal 85 and the negative pressure Pn of the engine 22.

Figure 2:
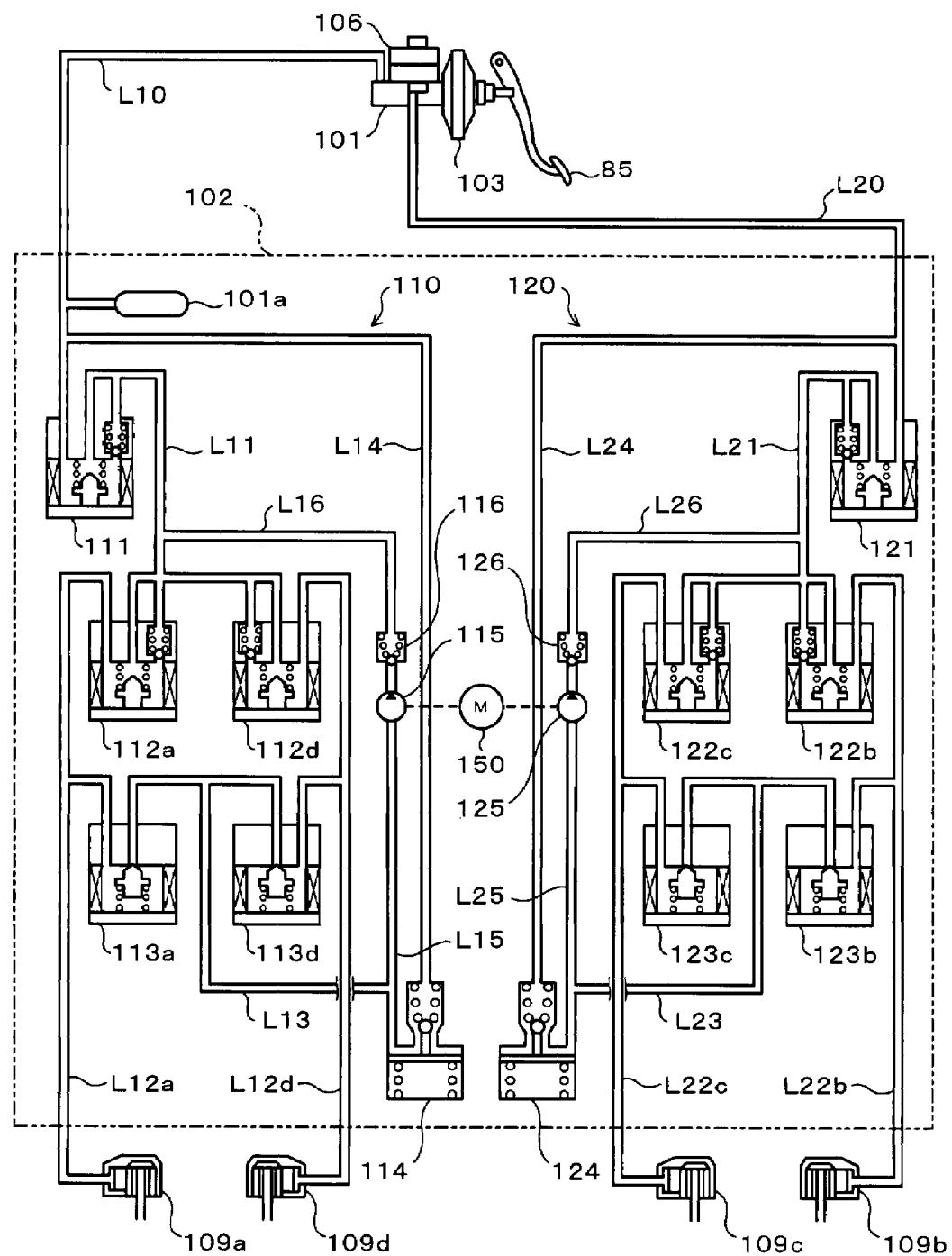
FIG. 2 is a system diagram of a brake actuator included in an electronically controlled hydraulic braking system mounted on the hybrid vehicle of the first embodiment.

The brake actuator 102 is actuated by the low-voltage battery 57 as the power source. The brake actuator 102 regulates the master cylinder pressure Pmc generated by the master cylinder 101 and supplies the regulated master cylinder pressure Pmc to the wheel cylinders 109a through 109d, while adjusting the hydraulic pressure in the wheel cylinders 109a through 109d to ensure application of braking force to the front wheels 65a and 65b and the rear wheels 65c and 65d regardless of the driver's pressing force of the brake pedal 85. FIG. 2 is a system diagram showing the structure of the brake actuator 102. As shown in FIG. 2, the brake actuator 102 is constructed in cross arrangement and has a first system 110 for the right front wheel 65a and the left rear wheel 65d and a second system 120 for the left front wheel 65b and the right rear wheel 65c. In the hybrid vehicle 20 of this embodiment, the engine 22 for driving the front wheels 65a and 65b is placed in the front portion of the vehicle body to give the front-deviated weight balance. The brake actuator 102 of the cross arrangement ensures application of braking force to at least one of the front wheels 65a and 65b even in the event of some failure in either the first system 110 or the second system 120. In this embodiment, the specification of the brake actuator 102 is determined to ensure application of the greater braking force to the front wheels 65a and 65b than the braking force applied to the rear wheels 65c and 65d, when the hydraulic pressure (wheel cylinder pressure) in the wheel cylinders 109a and 109b for the front wheels 65a and 65b is equal to the hydraulic pressure (wheel cylinder pressure) in the wheel cylinders 109c and 109d for the rear wheels 65c and 65d. The specification of the brake actuator 102 includes the friction coefficient of brake pads and the outer diameter of rotors in friction brake units, for example, disk brakes or drum brakes, which receive the hydraulic pressure from the wheel cylinders 109a through 109d to generate frictional braking force.

The first system 110 includes a master cylinder cut solenoid valve (hereafter referred to as 'MC cut solenoid valve') 111 connected with the master cylinder 101 via an oil supply path L10, and holding solenoid valves 112a and 112d linked to the MC cut solenoid valve 111 via an oil supply path L11 and respectively connected with the wheel cylinder 109a for the right front wheel 65a and with the wheel cylinder 109d for the left rear wheel 65d via pressure-varying oil paths L12a and L12d. The first system 110 also includes pressure reduction solenoid valves 113a and 113d respectively connected with the wheel cylinder 109a for the right front wheel 65a and with the wheel cylinder 109d for the left rear wheel 65d via the pressure-varying oil paths L12a and L12d, a reservoir 114 linked to the pressure reduction solenoid valves 113a and 113d via a pressure reduction oil path L13 and to the oil supply path L10 via an oil path L14, and a pump 115 having an inlet connected to the reservoir 114 via an oil path L15 and an outlet connected to the oil supply path L11 via an oil path L16 with a check valve 116. Similarly the second system 120 includes an MC cut solenoid valve 121 connected with the master cylinder 101 via an oil supply path L20, and holding solenoid valves 122b and 122c linked to the MC cut solenoid valve 121 via an oil supply path L21 and respectively connected with the wheel cylinder 109b for the left front wheel 65b and with the wheel cylinder 109c for the right rear wheel 65c via pressure-varying oil paths L22b and L22c. The second system 120 also includes pressure reduction solenoid valves 123b and 123c respectively connected with the wheel cylinder 109b for the left front wheel 65b and with the wheel cylinder 109c for the right rear wheel 65c via the pressure-varying oil paths L22b and L22c, a reservoir 124 linked to the pressure reduction solenoid valves 123b and 123c via a pressure reduction oil path L23 and to the oil supply path L20 via an oil path L24, and a pump 125 having an inlet connected to the reservoir 124 via an oil path L25 and an outlet connected to the oil supply path L21 via an oil path L26 with a check valve 126.

The MC cut solenoid valve 111, the holding solenoid valves 112a and 112d, the pressure reduction solenoid valves 113a and 113d, the reservoir 114, the pump 115, and the check valve 116 included in the first system 110 respectively correspond to and are identical with the MC cut solenoid valve 121, the holding solenoid valves 122b and 122c, the pressure reduction solenoid valves 123b and 123c, the reservoir 124, the pump 125, and the check valve 126 included in the second system 120. Each of the MC cut solenoid valves 111 and 121 is a linear solenoid valve that is full open in the power cut-off condition (off position) and has the opening adjustable by regulation of the electric current supplied to a solenoid. Each of the holding solenoid valves 112a, 112d, 122b, and 122c is a normally-open solenoid valve that is closed in the power supply condition (on position). Each of the holding solenoid valves 112a, 112d, 122b, and 122c has a check valve activated to return the flow of brake oil to the oil supply path L11 or L21 when the wheel cylinder pressure in the corresponding one of the wheel cylinders 109a through 109d is higher than the hydraulic pressure in the oil supply path L11 or L21 in the closed position of the holding solenoid valve 112a, 112d, 122b, or 122c under the power supply condition (on position). Each of the pressure reduction solenoid valves 113a, 113d, 123b, and 123c is a normally-closed solenoid valve that is opened in the power supply condition (on position). The pump 115 of the first system 110 and the pump 125 of the second system 120 are actuated by one single motor 150 (for example, a duty-controlled brushless DC motor). The pump 115 or 125 takes in and pressurizes the brake oil in the corresponding reservoir 114 or 124 and supplies the pressurized brake oil to the oil path L16 or L26.

The brake actuator 102 of the above construction has the operations described below. In the off position of all the MC cut solenoid valves 111 and 121, the holding solenoid valves 112a, 112d, 122b, and 122c, and the pressure reduction solenoid valves 113a, 113d, 123b, and 123c (in the state of FIG. 2), in response to the driver's depression of the brake pedal 85, the master cylinder 101 generates the master cylinder pressure Pmc corresponding to the driver's pressing force of the brake pedal 85 and the negative pressure Pn of the engine 22. The brake oil is then supplied to the wheel cylinders 109a through 109d via the oil supply paths L10 and L20, the MC cut solenoid valves 111 and 121, the oil supply paths L11 and L21, the holding solenoid valves 112a, 112d, 122b, and 122c, and the pressure-varying oil paths L12a, L12d, L22b, and L22c. The master cylinder pressure Pmc-based braking force is thus applied to the front wheels 65a and 65b and the rear wheels 65c and 65d. In response to the driver's subsequent release of the brake pedal 85, the brake oil in the wheel cylinders 109a through 109d is returned to a reservoir 106 of the master cylinder 101 via the pressure-varying oil paths L12a, L12d, L22b, and L22c, the holding solenoid valves 112a, 112d, 122b, and 122c, the oil supply paths L11 and L21, the MC cut solenoid valves 111 and 121, and the oil supply paths L10 and L20. This decreases the hydraulic pressure in the wheel cylinders 109a through 109d to release the braking force applied to the front wheels 65a and 65b and the rear wheels 65c and 65d. During application of the braking force to the front wheels 65a and 65b and the rear wheels 65c and 65d, the power supply to close the holding solenoid valves 112a, 112d, 122b, and 122c (on position) keeps the hydraulic pressure in the wheel cylinders 109a through 109d. The power supply to open the pressure reduction solenoid valves 113a, 113d, 123b, and 123c (on position) introduces the brake oil in the wheel cylinders 109a through 109d to the reservoirs 114 and 124 via the pressure-varying oil paths L12a, L12d, L22b, and L22c, the pressure reduction solenoid valves 113a, 113d, 123b, and 123c, and the pressure reduction oil paths L13 and L23 to reduce the wheel cylinder pressure in the wheel cylinders 109a through 109d. The brake actuator 102 accordingly attains antilock braking (ABS) control to prevent a skid of the hybrid vehicle 20 due to the lock of any of the front wheels 65a and 65b and the rear wheels 65c and 65d in response to the driver's depression of the brake pedal 85.

On the driver's depression of the brake pedal 85, the brake actuator 102 actuates the pumps 115 and 125 with reduction of the openings of the MC cut solenoid valves 111 and 112 to introduce the brake oil from the master cylinder 101 to the reservoirs 114 and 124. The brake oil introduced from the master cylinder 101 to the reservoirs 114 and 124 has the pressure increased by the pumps 115 and 125 and is fed to the wheel cylinders 109a through 109d via the oil paths L16 and L26, the holding solenoid valves 112a, 112d, 122b, and 122c, and the pressure-varying oil paths L12a, L12d, L22b, and L22c. Actuation of the pumps 115 and 125 simultaneously with the opening adjustment of the MC cut solenoid valves 111 and 121 attains the braking assist and gives the braking force as the sum of the master cylinder pressure Pmc and the pressure increase by the pumps 115 and 125. Even in the state of the driver's release of the brake pedal 85, actuation of the pumps 115 and 125 simultaneously with the opening adjustment of the MC cut solenoid valves 111 and 121 enables the brake oil introduced from the reservoir 106 of the master cylinder 101 to the reservoirs 114 and 124 of the brake actuator 102 to be pressurized by the pumps 115 and 125 and to be fed to the wheel cylinders 109a through 109d. The individual on-off control of the holding solenoid valves 112a, 112d, 122b, and 122c and the pressure reduction solenoid valves 113a, 113d, 123b, and 123c individually and freely regulates the pressure in each of the wheel cylinders 109a through 109d. The brake actuator 102 thus attains traction control (TRC) to prevent a skid of the hybrid vehicle 20 due to the wheelspin of any of the front wheels 65a and 65b and the rear wheels 65c and 65d in response to the driver's depression of the accelerator pedal 83. The brake actuator 102 also attains attitude stabilization control (VSC) to prevent a sideslip of any of the front wheels 65a and 65b and the rear wheels 65c and 65d, for example, during a turn of the hybrid vehicle 20.

The brake actuator 102 is driven and operated under control of a brake electronic control unit (hereafter referred to as 'brake ECU') 105. More specifically the brake ECU 105 controls the operations of the MC cut solenoid valves 111 and 121, the holding solenoid valves 112a, 112d, 122b, and 122c, the pressure reduction solenoid valves 113a, 113d, 123b, and 123c, and the motor 150 for actuating the pumps 115 and 125. The brake ECU 105 inputs the master cylinder pressure Pmc generated by the master cylinder 101 and measured by a master cylinder pressure sensor 101a, a negative pressure Pn in the brake booster 103 produced by the engine 22 and measured by a pressure sensor 103a, a signal from a pedal force detection switch 86 attached to the brake pedal 85 and mainly used in the event of a failure of the brake actuator 102, wheel speeds from respective wheel speed sensors (not shown) placed on the front wheels 65a and 65b and the rear wheels 65c and 65d, and a steering angle from a steering angle sensor (not shown). The brake ECU 105 makes communication with the hybrid ECU 70, the motor ECU 53, and the battery ECU 58. The brake ECU 105 controls the operation of the brake actuator 102 according to the input data including the master cylinder pressure Pmc and the negative pressure Pn, the state of charge (SOC) of the high-voltage battery 55, a rotation speed Nm of the motor, and control signals from the hybrid ECU 70, so as to attain the braking assist, the ABS control, the TRC, and the VSC. The brake ECU 105 outputs the operating conditions of the brake actuator 102 to the hybrid ECU 70, the motor ECU 53, and the battery ECU 58 according to the requirements.

The hybrid ECU 70 is constructed as a microprocessor including a CPU 72, a ROM 74 that stores processing programs, a RAM 76 that temporarily stores data, input and output ports (not shown), and a communication port (not shown). The hybrid ECU 70 receives, via its input port, an ignition signal from an ignition switch 80, a gearshift position SP or a current setting position of a gearshift lever 81 from a gearshift position sensor 82, an accelerator opening. Acc or the driver's depression amount of an accelerator pedal 83 from an accelerator pedal position sensor 84, a signal from the pedal force detection switch 86, and a vehicle speed V from a vehicle speed sensor 87. The hybrid ECU 70 generates diverse control signals in response to these input signals and transmits control signals and data to and from the engine ECU 24, the CVTECU 46, the motor ECU 53, the battery ECU 58, and the brake ECU 105 by communication. The hybrid ECU 70 outputs, via its output port, for example, driving signals to the starter motor 26 and the alternator 28 linked to the crankshaft 23 and control signals to the motor 60$a$ for the electric oil pump 60.

In the hybrid vehicle 20 of the embodiment, the gearshift position SP of the gearshift lever 81 has multiple different options: parking position selected for parking the vehicle, reverse position selected for reverse drive of the vehicle, neutral position (N position), normal drive position (D position) selected for forward drive of the vehicle, and brake position (B position) selected, for example, during a relatively high-speed downslope drive. The D position and the B position have driving force restrictions for setting a driving force demand required for the drive and drive point restrictions for setting a drive point of the engine 22 to satisfy the driving force demand. The driving force restriction at the B position specifies a lower minimum of an allowable power range or a greater braking force, compared with the driving force restriction at the D position. Selection of the B position thus gives a greater braking force in an accelerator released state under a preset condition than selection of the D position. When the driver operates the gearshift lever 81 to set the N position, in response to a control signal from the hybrid ECU 70, the CVTECU 46 sets off both the brake B1 and the clutch C1 of the forward-backward drive switchover mechanism 35 to decouple the output shaft 34 of the torque converter 30 from the input shaft 41 of the CVT 40. The motor ECU 53 shuts down the inverter 52 to prohibit the operation of the motor 50 (both power operation and regenerative operation).

In response to the driver's operation of the accelerator pedal 83, the hybrid vehicle 20 of the embodiment may be driven with the output power of the engine 22 transmitted to the front wheels 65$a$ and 65$b$, with the output power of the motor 50 transmitted to the rear wheels 65$c$ and 65$d$, or with both the output power of the engine 22 and the output power of the motor 50 as the four-wheel drive. The hybrid vehicle 20 is driven by the four-wheel drive, for example, in the event of abrupt acceleration by the driver's heavy depression of the accelerator pedal 83 or in the event of a skid or slip of any of the front wheels 65$a$ and 65$b$ and the rear wheels 65$c$ and 65$d$. When the driver releases the accelerator pedal 83 to give an accelerator off-based speed reduction requirement at the vehicle speed V of not lower than a predetermined level, the hybrid vehicle 20 of the embodiment sets both the brake B1 and the clutch C1 off to decouple the engine 22 from the CVT 40, stops the operation of the engine 22, and performs the regenerative control of the motor 50. The regenerative control of the motor 50 applies the braking force to the rear wheels 65$c$ and 65$d$ to decelerate the hybrid vehicle 20. The regenerative electric power generated by the motor 50 during deceleration may be used to charge the high-voltage battery 55. This arrangement desirably enhances the energy efficiency in the hybrid vehicle 20.

Figure 3:
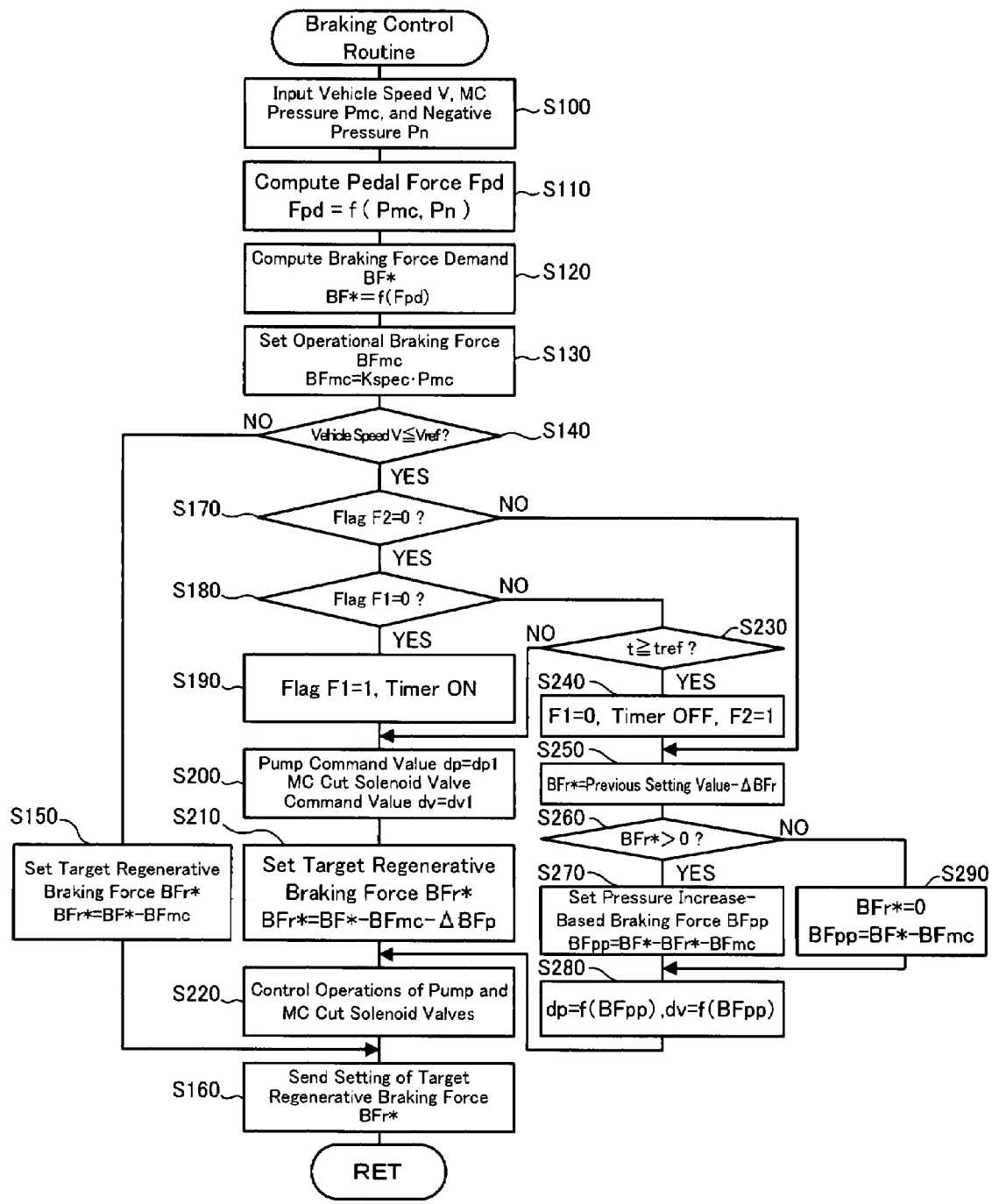
FIG. 3 is a flowchart showing a braking control routine executed by a brake ECU in the hybrid vehicle of the first embodiment.

The following describes a series of control to replace the regenerative braking force of the motor 50 with the braking force of the HBS 100 during braking of the hybrid vehicle 20 of the embodiment. FIG. 3 is a flowchart showing a braking control routine executed by the brake ECU 105 in the hybrid vehicle 20 of the embodiment. This braking control routine is repeatedly executed at preset time intervals to satisfy a braking force demand by the sum of the master cylinder pressure Pmc-based braking force and the regenerative braking force of the motor 50 when the driver depresses the brake pedal 85 at the vehicle speed V of a still relatively high level.

Figure 4:
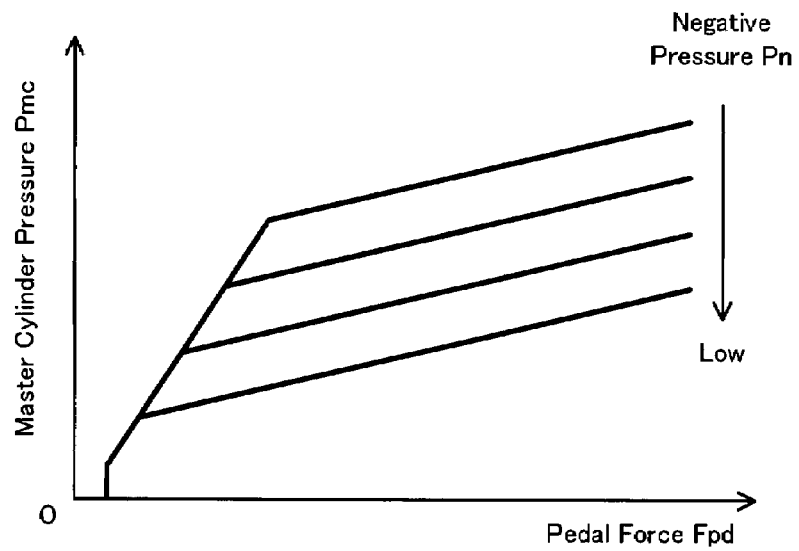
FIG. 4 shows one example of a pedal force setting map.
Figure 5:
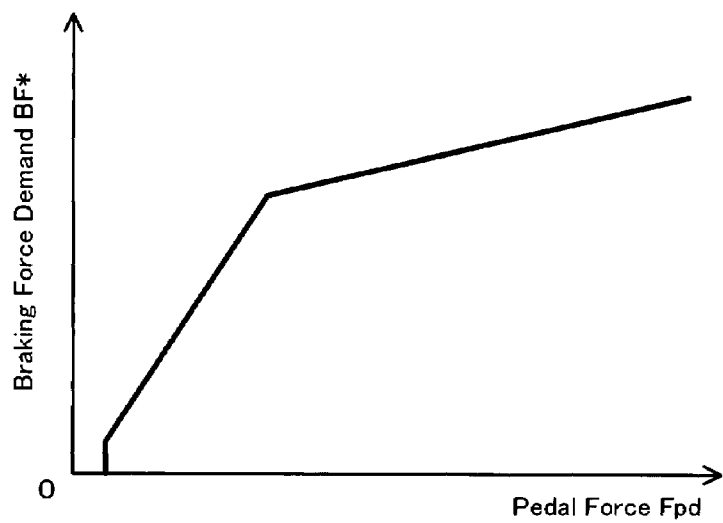
FIG. 5 shows one example of a braking force demand setting map.

On the start of the braking control routine shown in FIG. 3, a CPU (not shown) of the brake ECU 105 inputs required data for control, that is, the vehicle speed V from the vehicle speed sensor 87, the master cylinder pressure Pmc from the master cylinder pressure sensor 101$a$, and the negative pressure Pn from the pressure sensor 103$a$ (step S100). After the data input, the CPU computes a pedal force Fpd applied by the driver's depression of the brake pedal 85 from the input master cylinder pressure Pmc and the input negative pressure Pn (step S110). The procedure of this embodiment prepares and stores in advance variations in pedal force Fpd against the master cylinder pressure Pmc and the negative pressure Pn as a pedal force setting map in a ROM (not shown) of the brake ECU 105 and reads the pedal force Fpd corresponding to the given master cylinder pressure Pmc and the given negative pressure Pn from the pedal force setting map. FIG. 4 shows one example of the pedal force setting map. The CPU subsequently computes a braking force demand BF* as the driver's requirement from the set pedal force Fpd (step S120). The procedure of this embodiment prepares and stores in advance a variation in braking force demand BF* against the pedal force Fpd as a braking force demand setting map in the ROM of the brake ECU 105 and reads the braking force demand BF* corresponding to the given pedal force Fpd from the braking force demand setting map. FIG. 5 shows one example of the braking force demand setting map. The servo ratio in the brake booster 103 varies with a variation in negative pressure Pn applied from the engine 22 to the brake booster 103. By taking into account this variation, the braking control of this embodiment computes the pedal force Fpd given by the driver's depression of the brake pedal 85 according to the master cylinder pressure Pmc and the negative pressure Pn and sets braking force demand BF* corresponding to the computed pedal force Fpd. This enables accurate setting of the braking force demand BF* corresponding to the driver's requirement even in the event of a variation in negative pressure Pn applied from the engine 22 to the brake booster 103. The master cylinder pressure Pmc input at step S100 is multiplied by a constant Kspec to set a master cylinder pressure Pmc-based operational braking force BFmc (step S130). The constant Kspec is determined according to the braking specification including the outer diameter of the brake rotors, the diameter of the wheels, the sectional area of the wheel cylinders, and the friction coefficient of the brake pads.

The CPU then determines whether the vehicle speed V input at step S100 is not higher than a preset reference vehicle speed Vref (step S140). When the vehicle speed V exceeds the reference vehicle speed Vref (step S140: no), the result of subtraction of the operational braking force BFmc from the braking force demand BF* computed at step S120 is set to a target regenerative braking force BFr* of the motor 50 (step S150). The CPU sends the setting of the target regenerative braking force BFr* to the motor ECU 53 (step S160) and terminates the braking control routine of FIG. 3. In the case where the vehicle speed V at the moment of the driver's depression of the brake pedal 85 exceeds the preset reference vehicle speed Vref, the motor 50 is subjected to regenerative control to satisfy the braking force demand BF* by the sum of the regenerative braking force of the motor 50 and the master cylinder pressure Pmc-based operational braking force BFmc. In this state, the master cylinder pressure Pmc-based operational braking force BFmc is applied to the front wheels 65a and 65b and to the rear wheels 65c and 65d. The MC cut solenoid valves 111 and 121 are thus kept full open in the off position.

Figure 6:
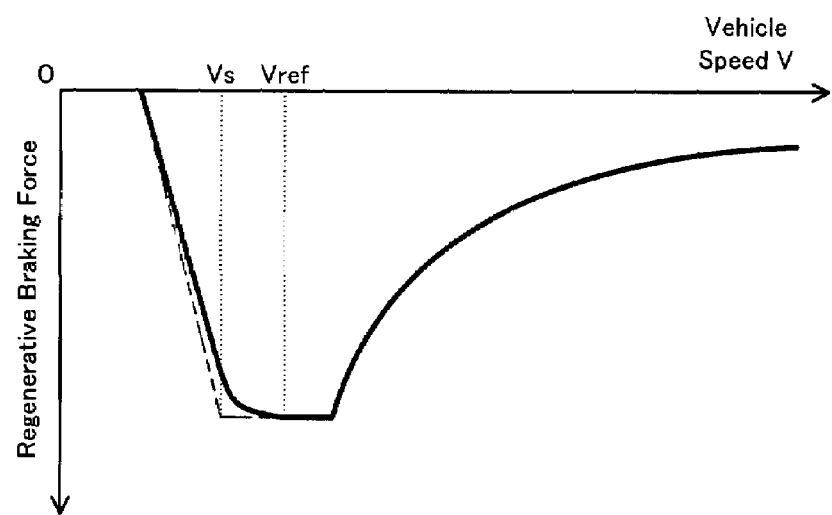
FIG. 6 is a graph showing a variation in regenerative braking force generated by the motor against the vehicle speed in the hybrid vehicle of the first embodiment.

The regenerative braking force of the motor 50 generally decreases with a decrease in vehicle speed V. By taking into account the operation efficiency and the heat evolution of the motor 50 in addition to the decreasing tendency of the regenerative braking force, it is desirable to stop the regenerative control of the motor 50 in response to a decrease of the vehicle speed V to or below a preset level and to replace the regenerative braking force of the motor 50 with the braking force of the HBS 100. The graph of FIG. 6 shows a variation in regenerative braking force of the motor 50 against the vehicle speed V. By additionally taking into account the operation efficiency and the heat evolution of the motor 50, a regeneration stop vehicle speed Vs is determined as a threshold value for starting the replacement of the regenerative braking force of the motor 50 with the braking force of the HBS 100, based on the graph of FIG. 6. In the hybrid vehicle 20 of the embodiment, the regenerative braking force of the motor 50 is replaceable with the braking force based on the pressure increase induced by pressurization of the brake oil by the pumps 115 and 125 of the brake actuator 102. The HBS 100 equipped with the brake actuator 102 of relatively simple structure that does not have an accumulator or pressure reservoir generally has a response delay and requires some time to obtain a desired response after the start of actuation of the pumps 115 and 125. The start of replacing the regenerative braking force of the motor 50 with the braking force of the HBS 100 at the moment of a decrease in vehicle speed V to the regeneration stop vehicle speed Vs may cause failed output of a braking force satisfying the driver's demand and make the driver feel uneasy and uncomfortable. The procedure of this embodiment calculates the reference vehicle speed Vref used as the threshold value at step S140 from the regeneration stop vehicle speed Vs, a response delay time trd, and a maximum deceleration Gmax according to Equation (1) given below:

$$Vref = Vs + Gmax \cdot trd + \alpha \quad (1)$$

In Equation (1), α denotes a positive or negative adjustment coefficient. The response delay time trd represents a time period elapsed between the start of actuation of the pumps 115 and 125 and the exertion of their proper pressurization performance, that is, a time period elapsed before cancellation of an initial response delay and achievement of a linear response to a command value since the start of actuation of the pumps 115 and 125. The maximum deceleration Gmax represents an upper limit deceleration of the hybrid vehicle 20 by means of the motor 50 or the HBS 100.

When the vehicle speed V is not higher than the reference vehicle speed Vref (step S140: yes), the CPU identifies whether a preset flag F2 is equal to 0 (step S170) In the case of the flag F2 equal to 0 (step S170: yes), the CPU further identifies whether a preset flag F1 is equal to 0 (step S180). When the vehicle speed V is not higher than the reference vehicle speed Vref and when both the flags F1 and F2 are equal to 0, the CPU sets the flag F1 to 1 and activates a timer (not shown) included in the brake ECU 105 to start the time counting (step S190). The CPU subsequently sets a duty ratio command value dp of the motor 150 for the pumps 115 and 125 to a preset value dp1 and sets a duty ratio command value dv for varying the openings of the MC cut solenoid valves 111 and 121 to a preset value dv1, which corresponds to the preset command value dp1 of the motor 150 for the pumps 115 and 125 (step S200). The command value dp1 for the pumps 115 and 125 and the command value dv1 for the MC cut solenoid valves 111 and 121 are experimentally and analytically specified as the values for canceling the response delay of the pressurization performance of the pumps 115 and 125. The CPU then calculates a target regenerative braking force BFr* of the motor 50 (step S210). The procedure of this embodiment experimentally and analytically specifies a time variation in increased braking force ΔBfp by the brake actuator 102 during operation control of the motor 150 for the pumps 115 and 125 with the fixed command value dp1 and operation control of the MC cut solenoid valves 111 and 121 with the fixed command value dv1. In this embodiment, a variation in increased braking force ΔBfp by the brake actuator 102 against time 't' counted by the timer since the start of operation control of the pumps 115 and 125 is stored in advance as a map in the ROM of the brake ECU 105. The operational braking force BFmc set at step S130 and the increased braking force ΔBfp corresponding to the time 't' read from the map are subtracted from the braking force demand BF* computed at step S120. The result of this subtraction is set to the target regenerative braking force BFr* at step S210. After setting the target regenerative braking force BFr*, the operation of the motor 150 for the pumps 115 and 125 and the operation of the solenoids of the MC cut solenoid valves 111 and 121 are controlled respectively with the duty ratio command value dp (=dp1) and with the duty ratio command value dv (=dv1) (step S220). The CPU then sends the set target regenerative braking force BFr* to the motor ECU 53 (step S160) and exits from the braking control routine of FIG. 3.

When the vehicle speed V decreases to or below the reference vehicle speed Vref in response to the driver's depression of the brake pedal 85, the braking control routine executes the processing flow of steps S190 to S220 and S160. When the flag F1 has been set equal to 1 at step S190 in the previous cycle of the braking control routine, the decision of step S180 gives a negative answer in the current cycle of the braking control routine. In the case of a negative answer at step S180, the CPU determines whether the time 't' counted by the timer as the time period elapsed since the start of operation control of the pumps 115 and 125 is not less than a preset reference time tref (step S230). The reference time tref is set according to the response delay time trd. When the time 't' is less than the preset reference time tref (step S230: no), the braking control routine executes the processing flow of steps S200 to S220 and S160. As described above, when the vehicle speed V decreases to or below the reference vehicle speed Vref in response to the driver's depression of the brake pedal 85, the hybrid vehicle 20 of the embodiment performs a replacement pre-operation for only a time period elapsed before cancellation of the initial response delay of the pressurization performance of the pumps 115 and 125 since the start of actuation of the pumps 115 and 125. The replacement pre-operation controls the operation of the motor 150 for the pumps 115 and 125 with the fixed command value dp1 and the operation of the MC cut solenoid valves 111 and 121 with the fixed command value dv1. During the replacement pre-operation, the regenerative braking force of the motor 50 compensates for an insufficiency of the braking force output from the HBS 100 due to the initial response delay of the pressurization performance of the pumps 115 and 125.

When the time 't' counted by the timer reaches or exceeds the preset reference time tref (step S230: yes), on the other hand, the CPU sets the flag F1 to 0, inactivates the timer to stop the time counting, and sets the flag F2 to 1 (step S240). The result of subtraction of a preset value ΔBFr from a previous setting value of the target regenerative braking force BFr* is set to the current target regenerative braking force BFr* of the motor 50 (step S250). The preset value ΔBFr used at step S250 is a limit value for gradually decreasing the regenerative braking force of the motor 50 and is determined by taking into account the proper pressurization performance of the pumps 115 and 125 after cancellation of the initial response delay. The CPU then determines whether the set target regenerative braking force BFr* is greater than 0 (step S260). When the target regenerative braking force BFr* is greater than 0, the result of subtraction of the target regenerative braking force BFr* set at step S250 and the operational braking force BFmc set at step S130 from the braking force demand BF* computed at step S120 is set to a pressure increase-based braking force BFpp, which is based on the pressure increase induced by pressurization of the brake oil by the pumps 115 and 125 (step S270). The pumps 115 and 125 are actuated to pressurize the brake oil fed from the master cylinder 101 and thereby compensate for an insufficient braking force due to the decrease in regenerative braking force of the motor 50. After setting the pressure increase-based braking force BFpp, the CPU sets the duty ratio command value dp of the motor 150 for the pumps 115 and 125 and the duty ratio command value dv of the MC cut solenoid valves 111 and 121 corresponding to the pressure increase-based braking force BFpp (step S280). In this embodiment, variations in duty ratio command value dp and duty ratio command value dv against the pressure increase-based braking force BFpp or the pressure increase by the pumps 115 and 125 are stored in advance as a command value setting map (not shown) in the ROM of the brake ECU 105. The duty ratio command values dp and dv are read corresponding to the given pressure increase-based braking force BFpp from the command value setting map. The operation of the motor 150 for the pumps 115 and 125 and the operation of the solenoids of the MC cut solenoid valves 111 and 121 are controlled respectively with the duty ratio command value dp and with the duty ratio command value dv (step S220). The CPU then sends the set target regenerative braking force BFr* to the motor ECU 53 (step S160) and exits from the braking control routine of FIG. 3.

When the flag F2 has been set equal to 1 at step S240 in the previous cycle of the braking control routine, the decision of step S170 gives a negative answer in the current cycle of the braking control routine. In the case of a negative answer at step S170, the braking control routine goes to step S250 and executes the processing of and after step S250. When the target regenerative braking force BFr* is not greater than 0 (step S260: no), the CPU resets the target regenerative braking force BFr* to 0 and sets the result of subtraction of the operational braking force BFmc from the braking force demand BF* to the pressure increase-based braking force BFpp (step S290). The braking control routine then executes the processing of steps S280, S220, and S160. As described above, the hybrid vehicle 20 of the embodiment performs the replacement pre-operation for the preset reference time tref. The replacement pre-operation controls the operation of the motor 150 for the pumps 115 and 125 with the fixed command value dp1 and the operation of the MC cut solenoid valves 111 and 121 with the fixed command value dv1. After the replacement pre-operation, the hybrid vehicle 20 of the embodiment performs a replacement operation. The replacement operation controls the motor 50 to gradually decrease the regenerative braking force to the level of 0, while controlling the operation of the motor 150 for the pumps 115 and 125 and the operation of the solenoids of the MC cut solenoid valves 111 and 121 to enhance the pressure increase by the pumps 115 and 125 and to make the decrease of the regenerative braking force compensated by the pressure increase-based braking force BFpp based on the pressure increase by the pumps 115 and 125. When it is determined at step S260 that the target regenerative braking force BFr* is not greater than 0, the braking force demand BF* is satisfied by the sum of the master cylinder pressure Pmc-based operational braking force BFmc and the pressure increase-based braking force BFpp based on the pressure increase by the pumps 115 and 125. The flag F2 is reset to 0, for example, at the moment of the driver's release of the brake pedal 85.

As described above, when the vehicle speed V decreases to or below the preset reference vehicle speed Vref during output of regenerative braking force from the motor 50 in response to the driver's depression of the brake pedal 85, the hybrid vehicle 20 of the embodiment performs the replacement pre-operation (steps S190 to S220 and S160) and the replacement operation (steps S240 to S280 and S160) and controls the motor 50 and the HBS 100 to satisfy the braking force demand BF*. The replacement pre-operation actuates and controls the pumps 115 and 125 included in the brake actuator 102 of the HBS 100 to exert their proper pressurization performance. The replacement operation decreases the regenerative braking force output from the motor 50 and enhances a pressure increase by the pumps 115 and 125 to replace the regenerative braking force with the pressure increase-based braking force BFpp. In the hybrid vehicle 20 of the embodiment, after the preliminary operation control of the motor 150 for the pumps 115 and 125 to exert the proper pressurization performance of the pumps 115 and 125, the substantial replacement operation is performed to replace the regenerative braking force output from the motor 50 with the pressure increase-based braking force BFpp based on the pressure increase by the pumps 115 and 125. This enables smooth replacement of the regenerative braking force of the motor 50 with the braking force of the HBS 100 and ensures output of the braking force required by the driver. Such braking control effectively prevents the driver from feeling uneasy and uncomfortable against the driver's braking operation. The pumps 115 and 125 are actuated and controlled for only a time period elapsed before cancellation of the initial response delay of the pressurization performance of the pumps 115 and 125 since the start of actuation of the pumps 115 and 125. During this replacement pre-operation, the regenerative braking force of the motor 50 compensates for an insufficiency of the pressure increase-based braking force BFpp, which is based on the pressure increase by the pumps 115 and 125, due to the initial response delay of the pressurization performance of the pumps 115 and 125. This arrangement enables cancellation of the initial response delay of the pressurization performance of the pumps 115 and 125, while ensuring satisfaction of the braking force demand BF*. On completion of the replacement pre-operation, the pumps 115 and 125 exert the proper pressurization performance. The regenerative braking force of the motor 50 is thus smoothly replaced with the pressure increase-based braking force BFpp based on the pressure increase by the pumps 115 and 125.

In the hybrid vehicle 20 of the embodiment, the reference vehicle speed Vref is set to be higher than the regeneration stop vehicle speed Vs. The regeneration stop vehicle speed Vs is set as the threshold value for prohibiting regeneration by the motor 50, based on the variation in regenerative braking force generated by the motor 50 against the vehicle speed V. The replacement pre-operation is performed at the vehicle speed V of a still relatively high level, that is, at the timing of the decrease of the vehicle speed V to or below the reference vehicle speed Vref during the driver's depression of the brake pedal 85 as shown by the solid-line curve in FIG. 6. Such braking control ensures execution of the replacement operation at the timing requiring prohibition of regeneration by the motor 50, that is, at the vehicle speed V decreasing to or below the regeneration stop vehicle speed Vs. The regenerative braking force of the motor 50 is thus smoothly replaceable with the pressure increase-based braking force BFpp, which is based on the pressure increase by the pumps 115 and 125. The replacement pre-operation is a preliminary process before exertion of the proper pressurization performance of the pumps 115 and 125 and is performed at the vehicle speed V of a still relatively high level. During the replacement pre-operation, the hybrid vehicle 20 of the embodiment causes the regenerative braking force output from the motor 50 to compensate for an insufficiency of the braking force output from the HBS 100, while ensuring satisfaction of the braking force demand BF*. The decrease of the regenerative braking force in the replacement pre-operation should be substantially equivalent to the increase of the braking force output from the HBS 100 by the operation control of the motor 150 for the pumps 115 and 125. The decrease of the regenerative force in the replacement pre-operation may be equal to or approximate to 0.

In the hybrid vehicle 20 of the embodiment, under some conditions of the vehicle speed V and the braking force demand BF*, the braking force demand BF* may be unsatisfied by the sum of the master cylinder pressure Pmc-based operational braking force BFmc and the regenerative braking force of the motor 50. In this case, the pumps 115 and 125 of the brake actuator 102 are actuated and controlled to pressurize the brake oil fed from the master cylinder 101 and compensate for an insufficiency of the braking force. The vehicle speed V decreases to or below the preset reference vehicle speed Vref during braking accompanied with the operation control of the pumps 115 and 125. Under this condition, when the time 't' elapsed since the start of operation control of the pumps 115 and 125 is less than the preset reference time tref, the replacement pre-operation and the replacement operation described above are performed at an adequate timing before a further decrease of the vehicle speed V to or below the regeneration stop vehicle speed Vs. When the time 't' elapsed since the start of operation control of the pumps 115 and 125 is not less than the preset reference time tref, the replacement operation is performed at the timing of a further decrease of the vehicle speed V to or below the regeneration stop vehicle speed Vs.

B. Second Embodiment

A second embodiment of the invention is described below.

Figure 7:
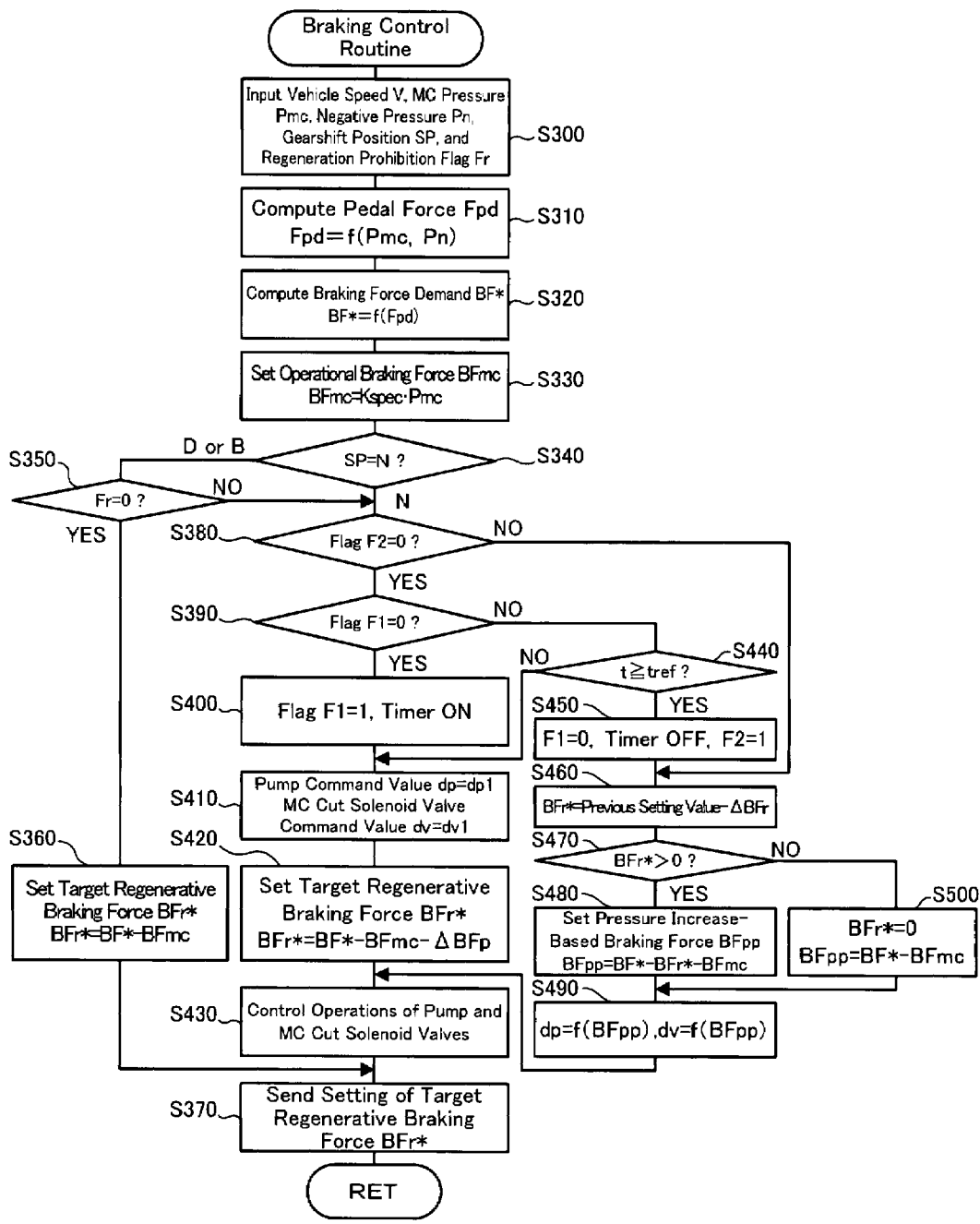
FIG. 7 is a flowchart showing a braking control routine executed by a hybrid vehicle in a second embodiment.

FIG. 7 is a flowchart showing another braking control routine that may be executed by the hybrid vehicle 20 described above. This braking control routine is also repeatedly executed at preset time intervals to satisfy a braking force demand by the sum of the master cylinder pressure Pmc-based braking force and the regenerative braking force of the motor 50 when the driver depresses the brake pedal 85.

On the start of the braking control routine shown in FIG. 7, a CPU (not shown) of the brake ECU 105 inputs required data for control, that is, the vehicle speed V from the vehicle speed sensor 87, the master cylinder pressure Pmc from the master cylinder pressure sensor 101a, the negative pressure Pn from the pressure sensor 103a, the gearshift position Sp from the gearshift position sensor 82, and the setting of a regeneration prohibition flag Fr (step S300). The regeneration prohibition flag Fr is set to give a command for stopping regeneration by the motor 50. The regeneration prohibition flag Fr is set according to the state of charge (SOC) of the high-voltage battery 55 by the battery ECU 58 and is received from the battery ECU 58 by communication. When the state of charge (SOC) of the high-voltage battery 55 reaches or exceeds a predetermined level, which has a certain margin to the full charge level, the battery ECU 58 sets the regeneration prohibition flag Fr to 1, in order to prohibit regeneration by the motor 50. When the state of charge (SOC) of the high-voltage battery 55 is lower than the predetermined level, the battery ECU 58 resets the regeneration prohibition flag Fr to 0, in order to allow regeneration by the motor 50.

After the data input at step S300, the CPU computes a pedal force Fpd applied by the driver's depression of the brake pedal 85 from the input master cylinder pressure Pmc and the input negative pressure Pn (step S310). The procedure at step S310 reads the pedal force Fpd corresponding to the given master cylinder pressure Pmc and the given negative pressure Pn from the pedal force setting map which is shown in FIG. 4. The CPU subsequently computes a braking force demand BF* as the driver's requirement from the set pedal force Fpd (step S320). The procedure at step S320 reads the braking force demand BF* corresponding to the given pedal force Fpd from the braking force demand setting map which is shown in FIG. 5. The servo ratio in the brake booster 103 varies with a variation in negative pressure Pn applied from the engine 22 to the brake booster 103. By taking into account this variation, the braking control of this embodiment computes the pedal force Fpd given by the driver's depression of the brake pedal 85 according to the master cylinder pressure Pmc and the negative pressure Pn and sets braking force demand BF* corresponding to the computed pedal force Fpd. This enables accurate setting of the braking force demand BF* corresponding to the driver's requirement even in the event of a variation in negative pressure Pn applied from the engine 22 to the brake booster 103. The master cylinder pressure Pmc input at step S300 is multiplied by a constant Kspec to set a master cylinder pressure Pmc-based operational braking force BFmc (step S330). The constant Kspec is determined according to the braking specification including the outer diameter of the brake rotors, the diameter of the wheels, the sectional area of the wheel cylinders, and the friction coefficient of the brake pads.

The CPU then identifies whether the gearshift position SP input at step S300 is the N position (step S340). When the gearshift position SP is identified as either the D position or the B position, the CPU identifies whether the regeneration prohibition flag Fr input at step S300 is equal to 0 (step S350) When the regeneration prohibition flag Fr is equal to 0 (step S350: yes), the result of subtraction of the operational braking force BFmc from the braking force demand BF* computed at step S320 is set to a target regenerative braking force BFr* of the motor 50 (step S360). The CPU sends the setting of the target regenerative braking force BFr* to the motor ECU 53 (step S370) and terminates the braking control routine of FIG. 7. In this state, the master cylinder pressure Pmc-based operational braking force BFmc is applied to the front wheels 65a and 65b and to the rear wheels 65c and 65d. The MC cut solenoid valves 111 and 121 are thus kept full open in the off position.

When the gearshift position SP is identified as the N position at step S340 or when the regeneration prohibition flag Fr is equal to 1 at step S350, on the other hand, the command for stopping regeneration by the motor 50 is given in response to the driver's gearshift operation or according to the state of charge (SOC) of the high-voltage battery 55. In either of these cases, the CPU identifies whether a preset flag F2 is equal to 0 (step S380). In the case of the flag F2 equal to 0 (step S380: yes), the CPU further identifies whether a preset flag F1 is equal to 0 (step S390). In the case of the flag F1 equal to 0 (step S390: yes), the CPU sets the flag F1 to 1 and activates a timer (not shown) included in the brake ECU 105 to start the time counting (step S400). The CPU subsequently sets a duty ratio command value dp of the motor 150 for the pumps 115 and 125 to a preset value dp1 and sets a duty ratio command value dv for varying the openings of the MC cut solenoid valves 111 and 121 to a preset value dv1, which corresponds to the preset command value dp1 of the motor 150 for the pumps 115 and 125 (step S410). The command value dp1 for the pumps 115 and 125 and the command value dv1 for the MC cut solenoid valves 111 and 121 are experimentally and analytically specified as the values for canceling the response delay of the pressurization performance of the pumps 115 and 125. The CPU then calculates a target regenerative braking force BFr* of the motor 50 (step S420). The procedure of this embodiment experimentally and analytically specifies a time variation in increased braking force ABFp by the HBS 100 during operation control of the motor 150 for the pumps 115 and 125 with the fixed command value dp1 and operation control of the MC cut solenoid valves 111 and 121 with the fixed command value dv1. In this embodiment, a variation in increased braking force ABFp by the HBS 100 against time 't' counted by the timer since the start of operation control of the pumps 115 and 125 is stored in advance as a map in the ROM of the brake ECU 105. The operational braking force BFmc set at step S330 and the increased braking force ΔBFp corresponding to the time 't' read from the map are subtracted from the braking force demand BF* computed at step S320. The result of this subtraction is set to the target regenerative braking force BFr* at step S420. After setting the target regenerative braking force BFr*, the operation of the motor 150 for the pumps 115 and 125 and the operation of the solenoids of the MC cut solenoid valves 111 and 121 are controlled respectively with the duty ratio command value dp (=dp1) and with the duty ratio command value dv (=dv1) (step S430). The CPU then sends the set target regenerative braking force BFr* to the motor ECU 53 (step S370) and exits from the braking control routine of FIG. 7.

Figure 8:
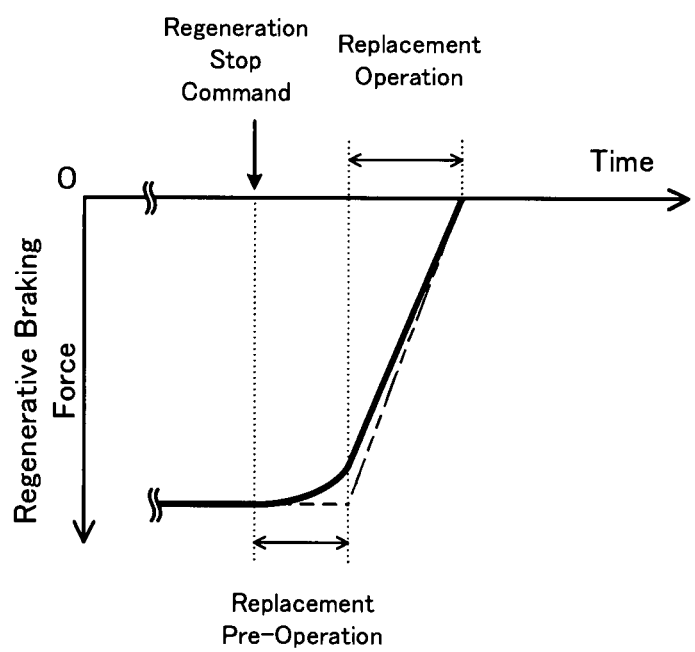
FIG. 8 is a graph showing a variation in regenerative braking force generated by the motor in response to a command for stopping regeneration by the motor in the hybrid vehicle of the second embodiment.

When the driver changes over the gearshift position SP from the D position (set for the ordinary drive) or the B position to the N position or when the regeneration prohibition flag Fr is set to 1 by the battery ECU 58, the braking control routine executes the processing flow of steps S400 to S430 and S370. When the flag F1 has been set equal to 1 at step S400 in the previous cycle of the braking control routine, the decision of step S390 gives a negative answer in the current cycle of the braking control routine. In the case of a negative answer at step S390, the CPU determines whether the time 't' counted by the timer as the time period elapsed since the start of operation control of the pumps 115 and 125 is not less than a preset reference time tref (step S440). The reference time tref used as the threshold value at step S440 is set according to a response delay time trd. The response delay time trd is specified experimentally and analytically as a time period elapsed between the start of actuation of the pumps 115 and 125 and the exertion of their proper pressurization performance, that is, a time period elapsed before cancellation of an initial response delay and achievement of a linear response to a command value since the start of actuation of the pumps 115 and 125. When the time 't' is less than the preset reference time tref (step S440: no), the braking control routine executes the processing flow of steps S410 to S430 and S370. As described above, when the command for stopping regeneration by the motor 50 is given in response to the driver's gearshift operation or according to the state of charge (SOC) of the high-voltage battery 55, the second embodiment of the invention performs a replacement pre-operation as shown in FIG. 8 for only a time period elapsed before cancellation of the initial response delay of the pressurization performance of the pumps 115 and 125 since the start of actuation of the pumps 115 and 125. The replacement pre-operation controls the operation of the motor 150 for the pumps 115 and 125 with the fixed command value dp1 and the operation of the MC cut solenoid valves 111 and 121 with the fixed command value dv1. The HBS 100 equipped with the brake actuator 102 of relatively simple structure that does not have an accumulator or pressure reservoir generally has a response delay and requires some time to obtain a desired response after the start of actuation of the pumps 115 and 125. The second embodiment of the invention performs this replacement pre-operation in response to the driver's gear change to the N position or in response to setting of the regeneration prohibition flag Fr to 1 during braking with the regenerative braking force. During the replacement pre-operation, the regenerative braking force of the motor 50 compensates for an insufficiency of the braking force output from the HBS 100 due to the initial response delay of the pressurization performance of the pumps 115 and 125.

When the time 't' counted by the timer reaches or exceeds the preset reference time tref (step S440: yes), on the other hand, the CPU sets the flag F1 to 0, inactivates the timer to stop the time counting, and sets the flag F2 to 1 (step S450) The result of subtraction of a preset value ΔBFr from a previous setting value of the target regenerative braking force BFr* is set to the current target regenerative braking force BFr* of the motor 50 (step S460). The preset value ΔBFr used at step S460 is a limit value for gradually decreasing the regenerative braking force of the motor 50 and is determined by taking into account the proper pressurization performance of the pumps 115 and 125 after cancellation of the initial response delay. The CPU then determines whether the set target regenerative braking force BFr* is greater than 0 (step S470). When the target regenerative braking force BFr* is greater than 0, the result of subtraction of the target regenerative braking force BFr* set at step S460 and the operational braking force BFmc set at step S330 from the braking force demand BF* computed at step S320 is set to a pressure increase-based braking force BFpp, which is based on the pressure increase induced by pressurization of the brake oil by the pumps 115 and 125 (step S480). The pumps 115 and 125 are actuated to pressurize the brake oil fed from the master cylinder 101 and thereby compensate for an insufficient braking force due to the decrease in regenerative braking force of the motor 50. After setting the pressure increase-based braking force BFpp, the CPU sets the duty ratio command value dp of the motor 150 for the pumps 115 and 125 and the duty ratio command value dv of the MC cut solenoid valves 111 and 121 corresponding to the pressure increase-based braking force BFpp (step S490). In this embodiment, variations in duty ratio command value dp and duty ratio command value dv against the pressure increase-based braking force BFpp or the pressure increase by the pumps 115 and 125 are stored in advance as a command value setting map (not shown) in the ROM of the brake ECU 105. The duty ratio command values dp and dv are read corresponding to the given pressure increase-based braking force BFpp from the command value setting map. The operation of the motor 150 for the pumps 115 and 125 and the operation of the solenoids of the MC cut solenoid valves 111 and 121 are controlled respectively with the duty ratio command value dp and with the duty ratio command value dv (step S430). The CPU then sends the set target regenerative braking force BFr* to the motor ECU 53 (step S370) and exits from the braking control routine of FIG. 7.

When the flag F2 has been set equal to 1 at step S450 in the previous cycle of the braking control routine, the decision of step S380 gives a negative answer in the current cycle of the braking control routine. In the case of a negative answer at step S380, the braking control routine goes to step S460 and executes the processing of and after step S460. When the target regenerative braking force BFr* is not greater than 0 (step S470: no), the CPU resets the target regenerative braking force BFr* to 0 and sets the result of subtraction of the operational braking force BFmc from the braking force demand BF* to the pressure increase-based braking force BFpp (step S500). The braking control routine then executes the processing of steps S490, S430, and S370. As described above, the second embodiment of the invention performs the replacement pre-operation for the preset reference time tref as shown in FIG. 8. The replacement pre-operation controls the operation of the motor 150 for the pumps 115 and 125 with the fixed command value dp1 and the operation of the MC cut solenoid valves 111 and 121 with the fixed command value dv1. After the replacement pre-operation, the hybrid vehicle 20 of the embodiment performs a replacement operation. The replacement operation controls the motor 50 to gradually decrease the regenerative braking force to the level of 0, while controlling the operation of the motor 150 for the pumps 115 and 125 and the operation of the solenoids of the MC cut solenoid valves 111 and 121 to enhance the pressure increase by the pumps 115 and 125 and to make the decrease of the regenerative braking force compensated by the pressure increase-based braking force BFpp based on the pressure increase by the pumps 115 and 125. When it is determined at step S470 that the target regenerative braking force BFr* is not greater than 0, the braking force demand BF* is satisfied by the sum of the master cylinder pressure Pmc-based operational braking force BFmc and the pressure increase-based braking force BFpp based on the pressure increase by the pumps 115 and 125. The flag F2 is reset to 0, for example, at the moment of the driver's release of the brake pedal 85. When it is determined at step S470 that the target regenerative braking force BFr* is not greater than 0, the brake ECU 105 sends a signal representing the decrease of the target regenerative braking force BFr* to or below 0 to the motor ECU 53. The motor ECU 53 receives the signal and shuts down the inverter 52 to stop the operation (regenerative operation) of the motor 50.

When the command for stopping regeneration by the motor 50 is given by the driver's setting of the gearshift position to the N position or by the setting of the regeneration prohibition flag Fr to 1 by the battery ECU 58 during the driver's depression of the brake pedal 85 to output the regenerative braking force from the motor 50, the second embodiment of the invention performs the replacement pre-operation (steps S400 to S430 and S370) and the replacement operation (steps S450 to S490 and S370) and controls the motor 50 and the HBS 100 to satisfy the braking force demand BF*. The replacement pre-operation actuates and controls the pumps 115 and 125 included in the brake actuator 102 of the HBS 100 to exert their proper pressurization performance. The replacement operation decreases the regenerative braking force output from the motor 50 and enhances a pressure increase by the pumps 115 and 125 to replace the regenerative braking force with the pressure increase-based braking force BFpp. In the hybrid vehicle 20 of the embodiment, after the preliminary operation control of the motor 150 for the pumps 115 and 125 to exert the proper pressurization performance of the pumps 115 and 125, the substantial replacement operation is performed to replace the regenerative braking force output from the motor 50 with the pressure increase-based braking force BFpp based on the pressure increase by the pumps 115 and 125. The command for stopping regeneration by the motor 50 given in response to the driver's gearshift operation or according to the state of charge (SOC) of the high-voltage battery 55 triggers this replacement of the regenerative braking force with the pressure increase-based braking force BFpp. The preliminary operation control prior to the substantial replacement enables smooth replacement of the regenerative braking force of the motor 50 with the braking force of the HBS 100 and ensures output of the braking force required by the driver. Such braking control effectively prevents the driver from feeling uneasy and uncomfortable against the driver's braking operation.

The pumps 115 and 125 are actuated and controlled for only a time period elapsed before cancellation of the initial response delay of the pressurization performance of the pumps 115 and 125 since the start of actuation of the pumps 115 and 125. During this replacement pre-operation, the regenerative braking force of the motor 50 compensates for an insufficiency of the pressure increase-based braking force BFpp, which is based on the pressure increase by the pumps 115 and 125, due to the initial response delay of the pressurization performance of the pumps 115 and 125. This arrangement enables cancellation of the initial response delay of the pressurization performance of the pumps 115 and 125, while ensuring satisfaction of the braking force demand BF*. On completion of the replacement pre-operation, the pumps 115 and 125 exert the proper pressurization performance. The regenerative braking force of the motor 50 is thus smoothly replaced with the pressure increase-based braking force BFpp based on the pressure increase by the pumps 115 and 125. In the hybrid vehicle 20 of the embodiment, the replacement pre-operation is a preliminary process before exertion of the proper pressurization performance of the pumps 115 and 125. During the replacement pre-operation, the second embodiment of the invention causes the regenerative braking force output from the motor 50 to compensate for an insufficiency of the braking force output from the HBS 100, while ensuring satisfaction of the braking force demand BF*. The decrease of the regenerative braking force in the replacement pre-operation should be substantially equivalent to the increase of the braking force output from the HBS 100 by the operation control of the motor 150 for the pumps 115 and 125. The decrease of the regenerative braking force in the replacement pre-operation may be equal to or approximate to 0.

In the second embodiment of the invention, under some conditions of the vehicle speed V and the braking force demand BF*, the braking force demand BF* may be unsatisfied by the sum of the master cylinder pressure Pmc-based operational braking force BFmc and the regenerative braking force of the motor 50. In this case, the pumps 115 and 125 of the brake actuator 102 are actuated and controlled to pressurize the brake oil fed from the master cylinder 101 and compensate for an insufficiency of the braking force. During braking accompanied with the operation control of the pumps 115 and 125, the driver may change over the gearshift position to the N position or the battery ECU 58 may set the regeneration prohibition flag Fr to 1, so as to give the command for stopping regeneration by the motor 50. Under such conditions, when the time 't' elapsed since the start of operation control of the pumps 115 and 125 is less than the preset reference time tref, the replacement pre-operation and the replacement operation are sequentially performed as described above. When the time 't' elapsed since the start of operation control of the pumps 115 and 125 is not less than the preset reference time tref, on the other hand, the replacement operation is performed immediately without the replacement pre-operation.

In the first embodiment and the second embodiment, the replacement operation controls the operation of the motor 50 to gradually decrease the regenerative braking force by the preset value ΔBFr, while controlling the operation of the pumps 115 and 125 to compensate for the decreased regenerative braking force. This procedure is, however, not restrictive. The replacement operation should drive and control the motor 50 and the pumps 115 and 125 to make a decrease of the regenerative braking force per unit time substantially equal to an enhancement of the pressure increase-based braking force BFpp, which is based on the pressure increase by the pumps 115 and 125, per unit time. The replacement operation may thus control the operation of the pumps 115 and 125 to gradually enhance the pressure increase-based braking force BFpp and control the operation of the motor 50 to decrease the regenerative braking force corresponding to the enhancement of the pressure increase-based braking force BFpp.

In the hybrid vehicle 20 of the embodiment, the power of the engine 22 is transmitted to the front wheels 65a and 65b via the output shaft 42 or the driveshaft. The power of the engine 22 may alternatively be transmitted to the rear wheels 65c and 65d via the rear axle 66. The power of the engine 22 may be connected to a generator, instead of transmission to the front wheels 65a and 65b or to the rear wheels 65c and 65d. In this modified structure, the motor 50 may be driven with electric power generated by the generator or with electric power generated by the generator and accumulated in a battery. Namely the technique of the invention is also applicable to series hybrid vehicles. In the hybrid vehicle 20 of the embodiment, the power of the motor 50 is transmitted to the rear wheels 65c and 65d via the rear axle 66. The power of the motor 50 may alternatively be transmitted to the front wheels 65a and 65b. The belt-driven CVT 40 may be replaced by a toroidal CVT or a step transmission.

The embodiment discussed above is to be considered in all aspects as illustrative and not restrictive. There may be many modifications, changes, and alterations without departing from the scope or spirit of the main characteristics of the present invention.

The disclosure of Japanese Patent Application No. 2006-112631 filed Apr. 14, 2006 and the disclosure of Japanese Patent Application No. 2006-112630 filed Apr. 14, 2006 including specification, drawings and claims are incorporated herein by reference in their entirety.

What is claimed is:

1. A vehicle, comprising:
a motor outputting at least a regenerative braking force to an axle;
a battery inputting and outputting electric power from and to the motor;
a fluid pressure braking unit including a pair of pumps for pressurization of an operation fluid and generating and outputting a braking force based on an operational pressure of the operation fluid produced by a driver's braking operation and a pressure increase of the operation fluid induced by pressurization of the operation fluid by the pair of pumps;
a braking force demand setting module setting a braking force demand required by the driver, in response to the driver's braking operation;
a vehicle speed measurement unit measuring vehicle speed; and
a braking control module controlling the motor and the fluid pressure braking unit to ensure output of the set braking force demand while performing a replacement pre-operation and a replacement operation upon satisfaction of a predetermined replacement condition during output of the regenerative braking force from the motor in response to the driver's braking operation, the replacement pre-operation being an operation that actuates and controls the motor of the pair of pumps with a preset command value and for a period of time that substantially corresponds to a performance delay of the pair of pumps to exert its proper pressurization performance, the replacement operation being an operation that decreases the regenerative braking force output from the motor and enhances the pressure increase by the pair of pumps to replace the regenerative braking force with a pressure increase-based braking force, the replacement condition being satisfied when the measured vehicle speed decreases to or below a preset reference vehicle speed which is higher than a regeneration stop vehicle speed, the regeneration stop vehicle speed being determined as a threshold value for starting the replacement of the regenerative braking force of the motor with the braking force of the fluid pressure braking unit,
wherein the replacement pre-operation causes a smaller decrease of the regenerative braking force than the decrease of the regenerative braking force in the replacement operation, and the replacement pre-operation is performed before the replacement operation.

2. The vehicle in accordance with claim 1, wherein the replacement pre-operation actuates and controls the pair of pumps in a specific mode for only a time period elapsed before cancellation of an initial response delay of the pressurization performance of the pair of pumps since a start of actuation of the pair of pumps and causes the regenerative braking force output from the motor to compensate for an insufficiency of the pressure increase-based braking force due to the initial response delay.

3. The vehicle in accordance with claim 1, wherein the replacement operation controls the motor and the pair of pumps of the fluid pressure braking unit to make a decrease of the regenerative braking force per unit time substantially equal to an enhancement of the pressure increase-based braking force per unit time.

4. The vehicle in accordance with claim 1, wherein the predetermined replacement condition is satisfied when a command for stopping regeneration by the motor is given.

5. The vehicle in accordance with claim 4, further comprising:
a driving power output source outputting a driving power either to the one axle or to the other axle different from the one axle;
a coupling-decoupling unit coupling and decoupling the driving power output source with and from either the one axle or the other axle; and
a gearshift position setting unit allowing the driver's setting of a neutral position to decouple the driving power output source from either the one axle or the other axle and to give an operation stop command for stopping operation of the motor, wherein the command for stopping regeneration by the motor is given in response to the driver's setting of the neutral position.

6. The vehicle in accordance with claim 4, wherein the command for stopping regeneration by the motor is given when a current state of charge of the battery reaches or exceeds a preset charge level.

7. A control method of a vehicle, the vehicle including: a motor outputting at least a regenerative braking force to an axle; a battery inputting and outputting electric power from and to the motor; a fluid pressure braking unit including a pair of pumps for pressurization of an operation fluid and generates and outputs a braking force based on an operational pressure of the operation fluid produced by a driver's braking operation and a pressure increase of the operation fluid induced by pressurization of the operation fluid by the pair of pumps; and a vehicle speed measurement unit measuring vehicle speed, the method comprising the steps of:

controlling the motor and the fluid pressure braking unit to ensure output of a braking force demand required by the driver while performing a replacement pre-operation and a replacement operation upon satisfaction of a predetermined replacement condition during output of the regenerative braking force from the motor in response to the driver's braking operation, the replacement pre-operation being an operation that actuates and controls the motor of the pair of pumps with a preset command value and for a period of time that substantially corresponds to a performance delay of the pair of pumps to exert its proper pressurization performance, the replacement operation being an operation that decreases the regenerative braking force output from the motor and enhances the pressure increase by the pair of pumps to replace the regenerative braking force with a pressure increase-based braking force, the replacement condition being satisfied when the measured vehicle speed decreases to or below a preset reference vehicle speed which is higher than a regeneration stop vehicle speed, the regeneration stop vehicle speed being determined as a threshold value for starting the replacement of the regenerative braking force of the motor with the braking force of the fluid pressure braking unit, wherein the replacement pre-operation causes a smaller decrease of the regenerative braking force than the decrease of the regenerative braking force in the replacement operation, and the replacement pre-operation is performed before the replacement operation.

8. The control method of the vehicle in accordance with claim 7, wherein the replacement pre-operation actuates and controls the pair of pumps in a specific mode for only a time period elapsed before cancellation of an initial response delay of the pressurization performance of the pair of pumps since a start of actuation of the pair of pumps and causes the regenerative braking force output from the motor to compensate for an insufficiency of the pressure increase-based braking force due to the initial response delay.

9. The control method of the vehicle in accordance with claim 7, wherein the replacement operation controls the motor and the pair of pumps of the fluid pressure braking unit to make a decrease of the regenerative braking force per unit time substantially equal to an enhancement of the pressure increase-based braking force per unit time.

10. The control method of the vehicle in accordance with claim 7, wherein the predetermined replacement condition is satisfied when a command for stopping regeneration by the motor is given.

11. The control method of the vehicle in accordance with claim 10, the vehicle further comprising:

a driving power output source outputting a driving power either to the one axle or to the other axle different from the one axle;

a coupling-decoupling unit coupling and decoupling the driving power output source with and from either the one axle or the other axle; and a gearshift position setting unit allowing the driver's setting of a neutral position to decouple the driving power output source from either the one axle or the other axle and to give an operation stop command for stopping operation of the motor, wherein the command for stopping regeneration by the motor is given in response to the driver's setting of the neutral position.

12. The control method of the vehicle in accordance with claim 10, wherein the command for stopping regeneration by the motor is given when a current state of charge of the battery reaches or exceeds a preset charge level.

13. A vehicle, comprising:

a motor outputting at least a regenerative braking force to an axle;

a battery inputting and outputting electric power from and to the motor;

a fluid pressure braking unit including a pair of pumps for pressurization of an operation fluid and generating and outputting a braking force based on an operational pressure of the operation fluid produced by a driver's braking operation and a pressure increase of the operation fluid induced by pressurization of the operation fluid by the pair of pumps;

a braking force demand setting module setting a braking force demand required by the driver, in response to the driver's braking operation;

a gearshift position setting unit allowing the driver's setting of a neutral position; and a braking control module controlling the motor and the fluid pressure braking unit to ensure output of the set braking force demand while performing a replacement pre-operation and a replacement operation in response to the driver's setting of the neutral position during output of the regenerative braking force from the motor in response to the driver's braking operation, the replacement pre-operation being an operation that actuates and controls the motor of the pair of pumps with a preset command value and for a period of time that substantially corresponds to a performance delay of the pair of pumps to exert its proper pressurization performance, the replacement operation being an operation that decreases the regenerative braking force output from the motor and enhances the pressure increase by the pair of pumps to replace the regenerative braking force with a pressure increase-based braking force, wherein the replacement pre-operation causes a smaller decrease of the regenerative braking force than the decrease of the regenerative braking force in the replacement operation, and the replacement pre-operation is performed before the replacement operation.

14. The vehicle in accordance with claim 13, further comprising:

a driving power output source outputting a driving power either to the one axle or to the other axle different from the one axle;

a coupling-decoupling unit coupling and decoupling the driving power output source with and from either the one axle or the other axle; and wherein, in response to the driver's setting of the neutral position, the driving power output source is decoupled from either the one axle or the other axle and an operation stop command is given for stopping operation of the motor.

15. The vehicle in accordance with claim 13, wherein the braking control module controls the motor and the fluid pressure braking unit to ensure output of the set braking force demand while performing the replacement pre-operation and the replacement operation when a current state of charge of the battery reaches or exceeds a preset charge level.

16. The vehicle in accordance with claim 13, wherein the replacement pre-operation actuates and controls the pair of pumps in a specific mode for only a time period elapsed before cancellation of an initial response delay of the pressurization performance of the pair of pumps since a start of actuation of the pair of pumps and causes the regenerative braking force output from the motor to compensate for an insufficiency of the pressure increase-based braking force due to the initial response delay.

17. The vehicle in accordance with claim 13, wherein the replacement operation controls the motor and the pair of pumps of the fluid pressure braking unit to make a decrease of the regenerative braking force per unit time substantially equal to an enhancement of the pressure increase-based braking force per unit time.

18. A control method of a vehicle, the vehicle including: a motor outputting at least a regenerative braking force to an axle; a battery inputting and outputting electric power from and to the motor; a fluid pressure braking unit including a pair of pumps for pressurization of an operation fluid and generates and outputs a braking force based on an operational pressure of the operation fluid produced by a driver's braking operation and a pressure increase of the operation fluid induced by pressurization of the operation fluid by the pair of pumps; and a gearshift position setting unit allowing the driver's setting of a neutral position, the method comprising the steps of:

controlling the motor and the fluid pressure braking unit to ensure output of a braking force demand required by the driver while performing a replacement pre-operation and a replacement operation in response to the driver's setting of the neutral position during output of the regenerative braking force from the motor in response to the driver's braking operation, the replacement pre-operation being an operation that actuates and controls the motor of the pair of pumps with a preset command value and for a period of time that substantially corresponds to a performance delay of the pair of pumps to exert its proper pressurization performance, the replacement operation being an operation that decreases the regenerative braking force output from the motor and enhances the pressure increase by the pair of pumps to replace the regenerative braking force with a pressure increase-based braking force, wherein the replacement pre-operation causes a smaller decrease of the regenerative braking force than the decrease of the regenerative braking force in the replacement operation, and the replacement pre-operation is performed before the replacement operation.

19. The control method of the vehicle in accordance with claim 18, wherein the vehicle further comprises a driving power output source outputting a driving power either to the one axle or to the other axle different from the one axle, and a coupling-decoupling unit coupling and decoupling the driving power output source with and from either the one axle or the other axle, and wherein, in response to the driver's setting of the neutral position, the driving power output source is decoupled from either the one axle or the other axle and an operation stop command is given for stopping operation of the motor.

20. The control method of the vehicle in accordance with claim 18, wherein the motor and the fluid pressure braking unit are controlled to ensure output of the set braking force demand while performing the replacement pre-operation and the replacement operation when a current state of charge of the battery reaches or exceeds a preset charge level.

21. The control method of the vehicle in accordance with claim 18, wherein the replacement pre-operation actuates and controls the pair of pumps in a specific mode for only a time period elapsed before cancellation of an initial response delay of the pressurization performance of the pair of pumps since a start of actuation of the pair of pumps and causes the regenerative braking force output from the motor to compensate for an insufficiency of the pressure increase-based braking force due to the initial response delay.

22. The control method of the vehicle in accordance with claim 18, wherein the replacement operation controls the motor and the pair of pumps of the fluid pressure braking unit to make a decrease of the regenerative braking force per unit time substantially equal to an enhancement of the pressure increase-based braking force per unit time.

* * * * *

UNITED STATES PATENT AND TRADEMARK OFFICE
CERTIFICATE OF CORRECTION

PATENT NO. : 8,608,255 B2  
APPLICATION NO. : 11/727280  
DATED : December 17, 2013  
INVENTOR(S) : M. Shimada et al.

Page 1 of 1

It is certified that error appears in the above-identified patent and that said Letters Patent is hereby corrected as shown below:

In the Specification

At column 12, line 67, change "opening. Acc" to -- opening Acc --.

At column 15, line 52, change "(step S170) In the case" to -- (step S170). In the case --.

At column 16, line 16, change "ABfp" to -- $\Delta$Bfp --.

Signed and Sealed this  
Tenth Day of June, 2014

Michelle K. Lee  
*Deputy Director of the United States Patent and Trademark Office*